(12) United States Patent
Michihata et al.

(10) Patent No.: US 7,473,451 B2
(45) Date of Patent: Jan. 6, 2009

(54) FUEL CONTAINER

(75) Inventors: Keizo Michihata, Kurashiki (JP); Nahoto Hayashi, Kurashiki (JP)

(73) Assignee: Kuraray Co., Ltd., Kurashiki (JP)

( * ) Notice: Subject to any disclaimer, the term of this patent is extended or adjusted under 35 U.S.C. 154(b) by 251 days.

(21) Appl. No.: 10/796,012

(22) Filed: Mar. 10, 2004

(65) Prior Publication Data

US 2004/0170786 A1 Sep. 2, 2004

Related U.S. Application Data

(62) Division of application No. 09/628,281, filed on Jul. 28, 2000, now Pat. No. 6,737,132.

(30) Foreign Application Priority Data

| Jul. 29, 1999 | (JP) | ................................. 11-214773 |
| Sep. 30, 1999 | (JP) | ................................. 11-278194 |
| Nov. 8, 1999 | (JP) | ................................. 11-316841 |

(51) Int. Cl.
*B29D 22/00* (2006.01)
*B29D 23/00* (2006.01)
*B32B 1/06* (2006.01)

(52) U.S. Cl. .................... 428/35.7; 428/36.6; 428/36.7; 428/131; 220/4.14; 220/562

(58) Field of Classification Search ............... 428/35.7, 428/36.6, 36.7, 131; 220/4.14, 456, 455, 220/562
See application file for complete search history.

(56) References Cited

U.S. PATENT DOCUMENTS

| 2,830,721 | A | 4/1958 | Pinsky et al. ................ 215/12.2 |
| 3,779,420 | A | 12/1973 | Knaus ......................... 220/4.14 |

(Continued)

FOREIGN PATENT DOCUMENTS

EP    0 440 558    8/1991

(Continued)

OTHER PUBLICATIONS

Drewent Abstract, JP 58-220738, Dec. 22, 1983.

(Continued)

*Primary Examiner*—Michael C Miggins
(74) *Attorney, Agent, or Firm*—Oblon, Spivak, McClelland, Maier & Neustadt, P.C.

(57) ABSTRACT

A fuel container with high fuel barrier properties is provided. The fuel container is a coextrusion blow-molded fuel container having a container body made of a layered structure. The layered structure comprises: a barrier layer made of a barrier resin (A); and an inner layer and an outer layer made of a thermoplastic resin (B) that is different from the barrier resin (A); wherein a ratio (X/Y) of a distance (X) between end portions of the barrier layer at a pinch-off part of the fuel container and an average thickness (Y) of the container body is at least 1/10000 and at most 1/10; and wherein a ratio (Y1/Y) between a total thickness (Y1) of the layers of the container body that are located on the inside with respect to the barrier layer and an average thickness (Y) of the container body is at least 3/10 and at most 7/10.

27 Claims, 9 Drawing Sheets

U.S. PATENT DOCUMENTS

| | | | |
|---|---|---|---|
| 4,079,850 A | 3/1978 | Suzuki et al. | 215/12.2 |
| 4,511,610 A | 4/1985 | Yazaki et al. | |
| 5,441,781 A | 8/1995 | Uchida et al. | 428/35.7 |
| 5,547,096 A * | 8/1996 | Kleyn | 220/4.14 |
| 5,849,376 A | 12/1998 | Oishi et al. | 428/34.9 |
| 6,033,749 A * | 3/2000 | Hata et al. | 428/36.7 |
| 6,372,359 B1 | 4/2002 | Hayashi et al. | |
| 6,395,358 B1 | 5/2002 | Tai et al. | |
| 6,398,059 B1 | 6/2002 | Hayashi et al. | |
| 6,467,643 B1 | 10/2002 | Sadr | 220/562 |
| 6,503,588 B1 | 1/2003 | Hayashi et al. | |
| 6,667,083 B2 | 12/2003 | Hayashi et al. | |
| 6,677,017 B2 | 1/2004 | Tai et al. | |
| 6,720,053 B2 | 4/2004 | Tai et al. | |
| 2001/0045433 A1 | 11/2001 | Ellis | 220/562 |

FOREIGN PATENT DOCUMENTS

| | | |
|---|---|---|
| EP | 742096 | 11/1996 |
| EP | 0 834 415 | 4/1998 |
| EP | 0 992 539 | 4/2000 |
| EP | 1 108 599 | 6/2001 |
| EP | 1 108 653 | 6/2001 |
| JP | 50-100165 | 8/1975 |

OTHER PUBLICATIONS

Derwent Abstract, JP 09-029867, Feb. 4, 1997.
Derwent Abstract, JP 56-120345, Sep. 21, 1981.
Derwent Abstract, JP 024161, Feb. 2, 1993.
Derwent Abstract, JP 05-338098, Dec. 21, 1993.
Derwent Abstract, JP 61-171320, Aug. 2, 1986.

* cited by examiner

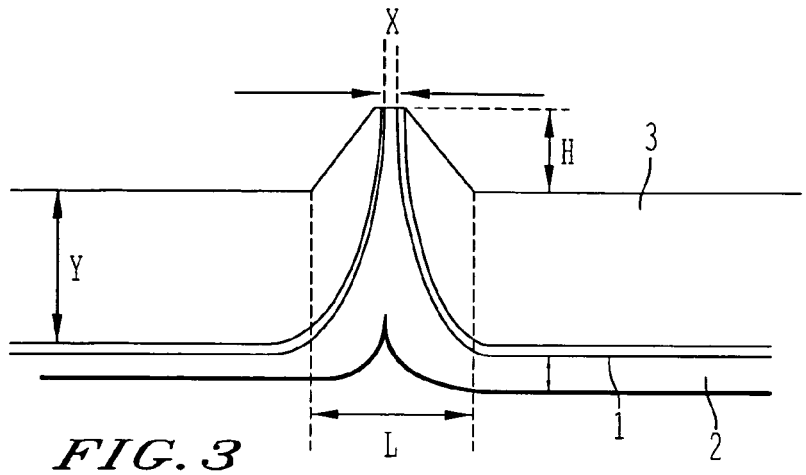
*FIG. 3*
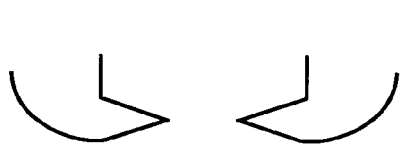
*FIG. 4A(1)*
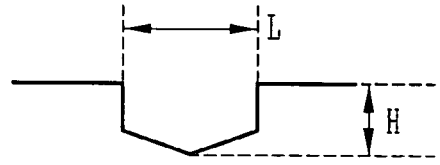
*FIG. 4A(2)*
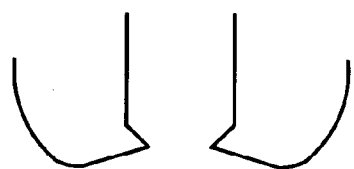
*FIG. 4B(1)*
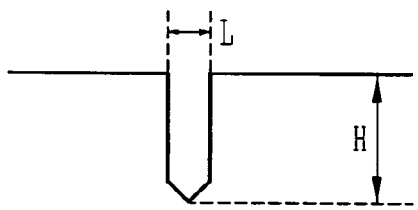
*FIG. 4B(2)*
*FIG. 4C(1)*
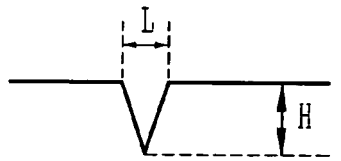
*FIG. 4C(2)*
*FIG. 4D(1)*
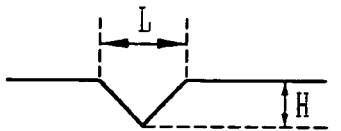
*FIG. 4D(2)*

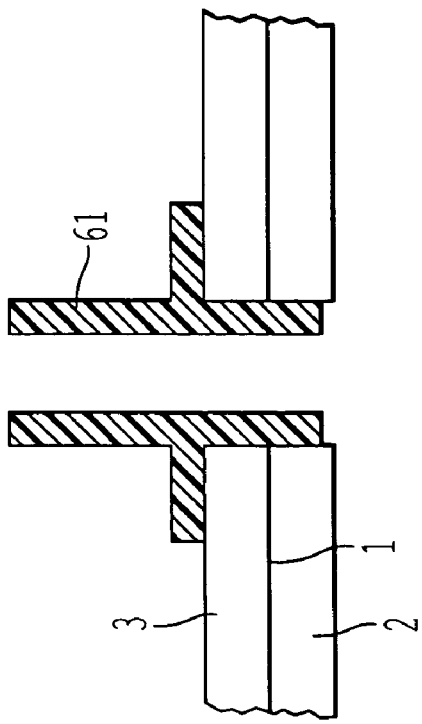
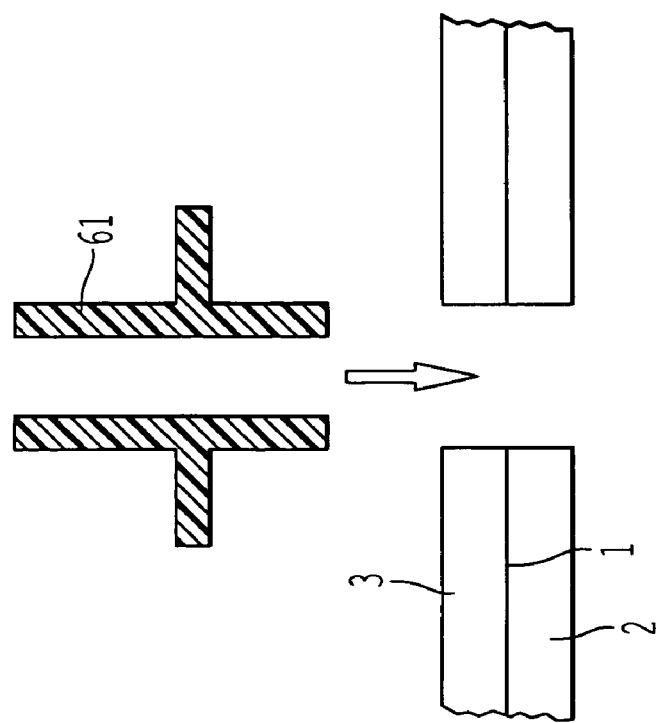

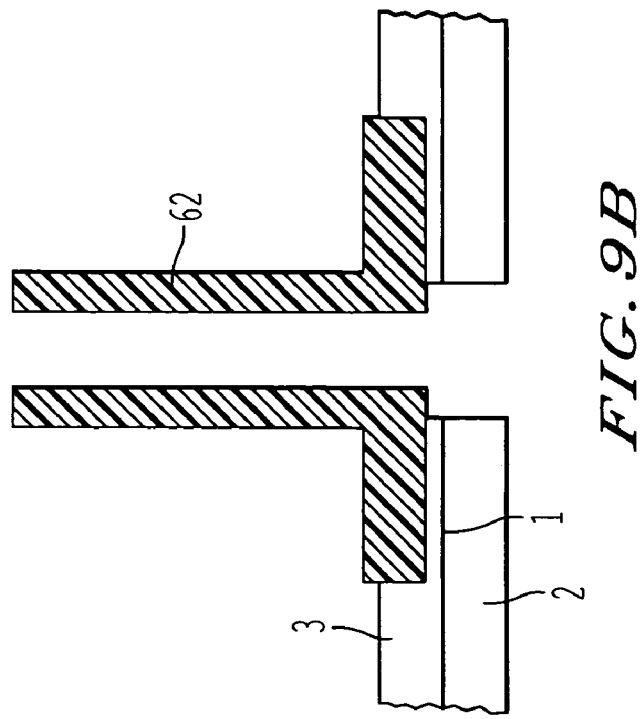
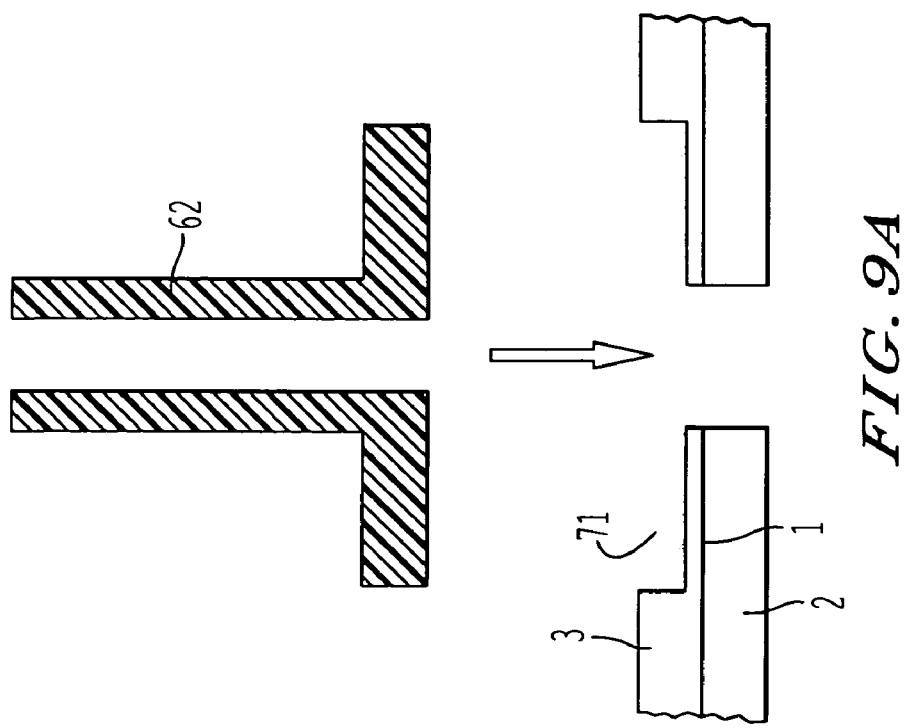
FIG. 9B
FIG. 9A

FUEL CONTAINER

BACKGROUND OF INVENTION

1. Field of the Invention

The present invention relates to a fuel container having high gasoline barrier properties.

2. Description of the Related Art

In recent years, coextrusion blow-molded containers made of plastic materials are preferably used for containers for storing fuels, such as gasoline, and examples for such containers are the fuel tanks of motor vehicles. As for the plastic material used as the material of such containers, there are high expectations in polyethylene (especially very high-density polyethylene) with regard to economic efficiency, molding processability, mechanical strength, and the like. However, it is known that fuel tanks made of polyethylene have a disadvantage that the stored liquid gasoline and/or the vaporized gasoline easily permeates through the polyethylene walls into the atmosphere.

To eliminate this disadvantage, a method is known in which a halogen gas (e.g. fluorine, chlorine, or bromine) or sulfur trioxide ($SO_3$) or the like is blown into the polyethylene container, and the inner wall of the container is halogenized or sulfonated. Another method that is known is to obtain a container that has a multilayered structure and is made of a polyamide resin layer and a polyethylene resin layer (see Japanese Laid-Open Patent Publication No. 6-134947, U.S. Pat. No. 5,441,781). Yet another method that is known is to obtain a container that has a multilayered structure and is made of an ethylene-vinyl alcohol copolymer (EVOH) resin layer and a polyethylene resin layer (see U.S. Pat. No. 5,849, 376 and EP 759359). Furthermore, a fuel tank is known, which has a multilayered structure and includes an inner layer, an outer layer, and a layer with gasoline barrier properties (i.e., a barer layer), and in order to enhance the gasoline barrier properties, the barrier layer is arranged closer to the inner layer (see Japanese Laid-Open Patent Publication No. 9-29904 and EP 742096).

However, in the manufacture of fuel containers according to these methods, the gasoline permeation amount cannot be suppressed sufficiently. Recently, there are strong demands with respect to the economic consumption of gasoline and the protection of the environment, and there is a strong demand for the reduction of the gasoline permeation amount in fuel containers.

SUMMARY OF INVENTION

A first fuel container of the present invention is a coextrusion blow-molded fuel container having a container body made of a layered structure, the layered structure comprising: a barrier layer made of a barrier resin (A); and an inner layer and an outer layer made of a thermoplastic resin (B) that is different from a the barrier resin (A); wherein a ratio (X/Y) of a distance (X between end portions of the barrier layer at a pinch-off part of the fuel container and an average thickness (Y) of the container body is at least 1/10000 and at most 1/10; and wherein a ratio (Y1/Y) between a total thickness (Y1) of the layers of the container body that are located on the inside with respect to the barrier layer and an average thickness (Y) of the container body is at least 3/10 and at most 7/10.

In a preferred embodiment, a ratio H/L between a height H of the pinch-off part and a width L of the pinch-off part of the container is 0.1 to 3.

In a preferred embodiment, a MFR (MFRbarrier) of the barrier resin (A) and a MFR (MFRinside) of a resin constituting an innermost layer of the container satisfy the following relation:

$$8 \leq MFR\text{barrier}/MFR\text{inside} \leq 100 \tag{1}$$

wherein MFRbarrier and MFRinside denote values measured at 190° C. under a load of 2160 g, and if the melting point of the resin is about 190° C. or higher, then the measurement is carried out under a load of 2160 g at a plurality of temperatures above the melting point, inverses of the absolute temperatures are marked on the horizontal axis and the logarithm of the MFR is plotted on the vertical axis in a semi-logarithmic graph, and the MFR is determined by extrapolation to 190° C.

A second fuel container of the present invention is a coextrusion blow-molded fuel container made of a layered structure, the layered structure at least comprising: a barrier layer made of a barrier resin (A); and an inner layer made of a thermoplastic resin (B) that is different from the barrier resin (A); wherein a cutting face of a pinch-off part of the container is covered by a barrier member made of a barrier material (C).

A third fuel container of the present invention is a fuel container made of a layered structure, the layered structure at least comprising: a barrier layer made of a barrier resin (A); and an outer layer made of a thermoplastic resin (B) that is different from the barrier resin (A); wherein the fuel container is provided with an opening through its body, wherein a cutting face of a layer at the opening is covered by a barrier member made of a barrier material (C), and wherein the layer covered by the barrier member is located on the outside with respect to the barrier layer.

A fourth fuel container of the present invention is a fuel container made of a layered structure, the layered structure at least comprising: a barrier layer made of a barrier resin (A); and an outer layer made of a thermoplastic resin (B) that is different from the barrier resin (A); wherein the fuel container is provided with an opening, a cut-out or a groove is provided at an outer surface of the fuel container around the opening, and the cut-out or the groove is covered or filled with a barrier member made of a barrier material (C).

In a preferred embodiment of the third and fourth fuel container, a pinch-off part of the fuel container is covered with a barrier member.

In a preferred embodiment of the third and fourth fuel container, a component for fuel containers is mounted onto the opening portion.

In a preferred embodiment, the component for fuel containers is a barrier member made of the barrier material (C), and the cut-out or groove is covered by attaching the component for fuel containers.

In a preferred embodiment, the cut-out or groove provided in the outer surface around the opening completely surrounds the opening.

In a preferred embodiment, a depth of the cut-out or groove is 0.1 to 0.8 times an average thickness (Y) of the container body.

In a preferred embodiment, a depth of the cut-out or groove is at least 0.2 and less than 1 times a total thickness (Y2) of layers locating on the outside with respect to the barrier layer.

In a preferred embodiment, a width of the cut-out or groove is 0.01 to 5 times an average thickness (Y) of the container body.

In a preferred embodiment, a ratio (Y2/Y) of total thickness (Y2) of layers located on the outside with respect to the barrier layer and the average thickness (Y) of the container body is at most 45/100.

In a preferred embodiment, the barrier member covers the cutting face, cut-out or groove via an adhesive.

In a preferred embodiment, a gasoline permeation amount (measured at 40° C. and 65% RH) of the barrier material (C) is at most 0.1 times a gasoline permeation amount (measured at 40° C. and 65% RH) of the thermoplastic resin (B).

In a preferred embodiment, a gasoline permeation amount (measured at 40° C. and 65% RH) of the barrier material (C) is at most 400 g·20 µm/m²·day.

In a preferred embodiment, the barrier material (C) is at least one selected from the group consisting of metal foil, epoxy resin, polyvinylidene chloride resin, polyvinylalcohol resin, polyamide resin, polyester resin, and fluorocarbon resin.

In a preferred embodiment of the second to fourth containers, the container comprises: an intermediate layer serving as the barrier layer; and an inner layer and an outer layer made of the thermoplastic resin (B).

In a preferred embodiment, an adhesive resin layer is located between the barrier layer and the layer made of the thermoplastic resin (B).

In a preferred embodiment, the fuel container comprises at least one recovered layer.

In a preferred embodiment, a gasoline permeation amount (measured at 40° C. and 65% RH) of the barrier resin (A) is at most 10 g·20 µm/m²·day.

In a preferred embodiment, the barer resin (A) is at least one selected from the group consisting of polyvinyl alcohol resins, polyamides, and aliphatic polyketones.

In a preferred embodiment, the thermoplastic resin (B) is a polyolefin.

In a preferred embodiment, the thermoplastic resin (B) is high-density polyethylene.

Therefore, the present invention described herein makes possible the objectives of: providing a fuel container having high barrier properties with respect to the fuel, for example gasoline, contained in the container; providing a blow-molded fuel container which sufficiently suppresses fuel permeation at a pinch-off part of the container, and in which the pinch-off part has sufficient contact strength, resulting in an excellent impact resistance; and providing a fuel container that effectively suppresses the fuel permeation at a bonding portion at which a component is attached to the container.

BRIEF DESCRIPTION OF THE DRAWINGS

FIG. 3 is a schematic view showing the pinch-off part of another coextrusion blow-molded fuel container that is not an embodiment of the present invention;

FIGS. 4a to 4d are schematic views showing the shape of pinch-off part forming sections of molds used for examples and comparative examples of the present invention (left column), and the shapes of the pinch-off parts of coextrusion blow-molded containers obtained with these molds (right column);

FIG. 8a and FIG. 8b illustrate the steps for covering the cutting face of the opening in the body of the fuel container with a barrier member;

FIG. 9a and FIG. 9b illustrate the steps for mounting a barrier member serving as a component for fuel containers on a cutout that is provided by cutting away a periphery of the opening in the body of the fuel container;

DESCRIPTION OF THE PREFERRED EMBODIMENTS

Figure 1:
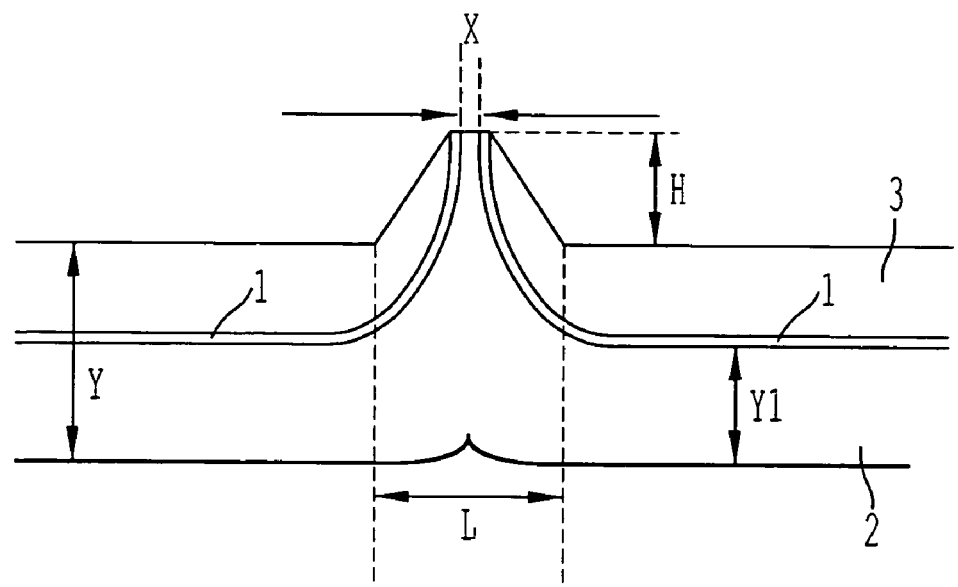
FIG. 1 is a schematic view showing the pinch-off part of a coextrusion blow-molded fuel container in an embodiment of the present invention.

As has been mentioned in the above-noted description of the related art, the inventors have performed extensive research to develop a fuel container with high fuel barrier properties.

As a result of this research, the inventors have found that the permeation of fuel from the container is particularly large at the portion of the pinch-off formed during the molding of the container, and also that the amount of fuel permeating through portions where components are attached to the container is too large to be ignored. As a result of concerted research efforts based on these insights, which the inventors were the first to ascertain, the inventors succeeded in developing a container having extra-ordinarily high fuel barrier properties, and thus accomplished the present invention.

The following is an explanation of the permeation of fuel at a pinch-off part and a portion where a component for fuel containers is attached, which led to the present invention.

Ordinarily, plastic fuel containers are made by blow-molding. For the manufacture of plastic containers by blow-molding, usually a parison is made by melt extrusion, the parison is held between a pair of molds for blow molding, and then, the parison is pinched off and the pinched off portion is fused at the same time. Then, the pinched-off parisons are formed into the shape of a container by expanding them inside the afore-mentioned molds. However, for large containers, such as vehicle fuel tanks, the parison is held and heat press-sealed, but not pinched off with the molds, and the heat-press portion that sticks out from the container surface is mostly cut off with a cutter at the desired height.

The afore-mentioned portion that is coupled by fusing is the pinch-off part. The pinch-off part forms a protruding line that tapers off in the thickness direction of the container wall. Usually, when an ordinary parison of a single layer of melted resin is pinched off, the parison can be sufficiently coupled at the pinched off portion. Consequently, there is only a low tendency to delaminate at the pinch-off part (which is the fused and coupled portion) and a low tendency of defective coupling, and in practice, containers with sufficient contact strength can be obtained. However, with single layers of polyethylene or the like, the resulting containers have poor fuel barrier properties. If the container is made with a single layer of a resin with high barrier properties, such as EVOH, then its impact resistance and moldability are insufficient, and there are disadvantages with regard to cost.

Therefore, such a fuel container is ordinarily produced from a multilayered structure by melt extrusion molding using several kinds of resins, including a resin with high barrier properties. The gasoline barrier properties of such a fuel container using the multilayered structure including a barrier layer are much better than those in a conventional fuel container using only polyethylene. However, in recent years, the demands on the gasoline barrier properties of plastic fuel containers have become even higher, and there is a strong demand for further improvement.

As a result of diligent research, the inventors were the first to find out that the permeation of fuel from plastic fuel containers is particularly large at pinch-off parts formed when the container is molded, as will be explained below.

As mentioned above, multilayered parisons obtained by melt extrusion of several kinds of resins have a cutting face (that is, a cutting face where the parison is pinched off with the molds or a surface where it is cut off with a cutter) at the pinch-off part. Because this cutting face is not covered with the resin with high barrier properties, gas may permeate through this cutting face.

However, the permeation of gas through the pinch-off parts of blow-molded containers has hitherto not been realized as a problem. This is because the amount of permeation of gas (for example, the amount of permeation of oxygen) in polyolefins is in the order of several thousand times larger than the amount of permeation of gas in EVOH, and furthermore the area of the pinch-off part is small compared with the surface area of the entire container.

However, as the result of the research by the inventors, it became clear for the first time that the difference between the gasoline permeation amounts of polyolefins and EVOH is in the order of several million times, and that therefore the permeation of fuel through the pinch-off parts of blow-molded containers, which has not been realized as a problem with the permeation of oxygen, is too large to be ignored.

An example of the related art, which puts its attention on the permeation of gas through the pinch-off part is disclosed in Japanese Laid-Open Patent Publication No. 50-100165. However, this publication examines only the permeation of oxygen, and fails to disclose or suggest that the difference between the gasoline permeation amounts of polyolefins and EVOH is extremely large. Consequently, it is impossible to obtain from this document the suggestion that the permeation of fuel through the pinch-off part of a blow-molded container is too large to be ignored.

Figure 2:
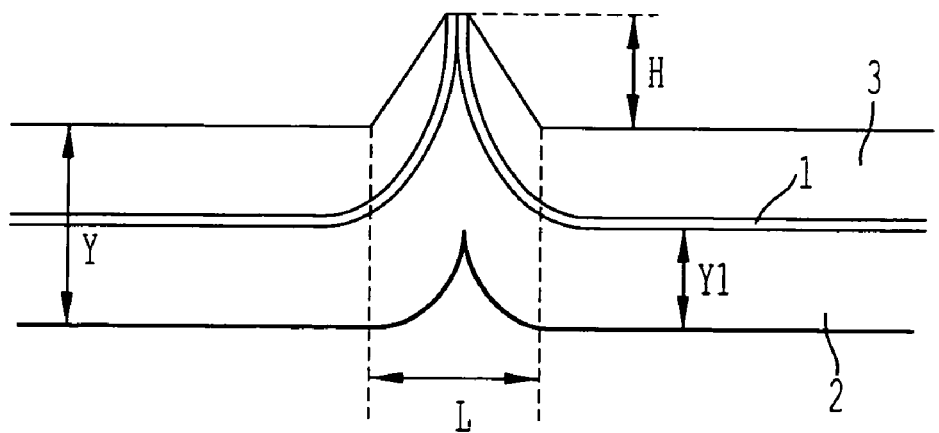
FIG. 2 is a schematic view showing the pinch-off part of a coextrusion blow-molded fuel container that is not an embodiment of the present invention.

To improve the barrier properties of the pinch-off part, this publication discloses a plastic multilayered container characterized in that the barrier layer of the multilayered structure is substantially continued at the pinch-off part. However, with such a multilayered container, it is not possible to attain sufficient contact strength at the pinch-off part, so that the impact resistance becomes unsatisfactory (see Comparative Example 3 and FIG. 2 of this specification).

In addition to the permeation of fuel through the pinch-off parts as explained above, another problem of fuel tanks for vehicles is the permeation of fuel through attached components for fuel containers and, as described above, the portions where the components are attached.

Usually, a vehicle fuel tank is connected by pipe ducts with a filler opening, an engine and a canister. Therefore, the body of the tank is provided with openings for connecting the tank with these pipe ducts, and the components (such as the connectors for the fuel tank) are installed to couple the tank with the pipe ducts. Conventionally, these components for fuel containers are almost invariably made of a polyolefin (e.g. high-density polyethylene) with poor gasoline barrier properties. The inventors of the present invention have performed research with the object of reducing the permeation of fuel through the components for fuel containers, and have developed a component that is made of a resin composition including EVOH (Japanese Patent Application Nos. 11-172151 and 11-172152). Using this resin composition including EVOH, a sweeping reduction of the amount of fuel permeated through the components for fuel containers was achieved.

However, even changing the conventional components for fuel containers made of high-density polyethylene into components made of the above-mentioned EVOH containing resin composition, the barrier properties that are expected from the barrier properties possessed by this composition itself were not obtained.

Figure 5:
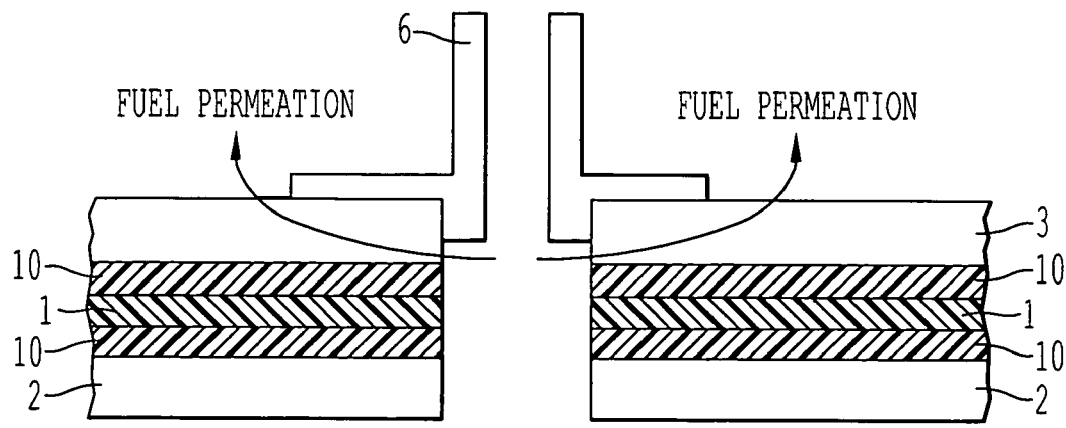
FIG. 5 is a schematic view of an embodiment, in which a component for fuel containers is mounted on an opening provided in the body of the fuel container.

The inventors were the first to find out that the fuel in the container vaporizes from the portions where the components are attached. For example, FIG. 5 shows a fuel container made of a multilayered structure including a barrier layer 1 and thermoplastic resin layers 2 and 3, in which a component 6 is attached to an opening portion of its body. At this opening portion, fuel may evaporate and pass through the layers that are located on the outside with respect to the barrier layer 1 (that is, generally speaking, the outer layer 3 made of a thermoplastic resin (B) and an adhesive layer 10) easily.

Thus, the inventors were the first to realize that the permeation of fuel through the pinch-off parts and the portions where components are attached is a serious problem, which nobody has considered before. Based on this insight and further research, the present invention was accomplished.

The following is a detailed explanation of the present invention.

The first fuel container in accordance with the present invention is a coextrusion blow-molded fuel container having a container body made of a layered structure, the layered structure comprising: a barrier layer made of a barrier resin (A); and an inner layer and an outer layer made of a thermoplastic resin (B) that is different from the barrier resin (A); wherein a ratio (X/Y) of a distance (X) between end portions of the barrier layer at a pinch-off part of the fuel container and an average thickness (Y) of the container body and a ratio (Y1/Y) between a total thickness (Y1) of the layers of the container body that are located on the inside with respect to the barrier layer and an average thickness (Y) of the container body are within predetermined ranges.

The second fuel container in accordance with the present invention is a coextrusion blow-molded fuel container made of a layered structure, the layered structure at least comprising: a barrier layer made of a barrier resin (A); and an inner layer made of a thermoplastic resin (B) that is different from the barrier resin (A); wherein a cutting face of a pinch-off part of the container is covered by a barrier member made of a barrier material (C).

The third fuel container in accordance with the present invention is made of a layered structure, and the layered structure at least comprises: a barrier layer made of a barrier resin (A); and an outer layer made of a thermoplastic resin (13) that is different from the barrier resin (A); wherein the fuel container is provided with an opening through its body, wherein a cutting face of a layer at the opening is covered by a barrier member made of a barrier material (C), and wherein the layer covered by the barrier member is located on the outside with respect to the barrier layer.

The fourth fuel container in accordance with the present invention is made of a layered structure, and the layered structure at least comprises: a barrier layer made of a barrier resin (A); and an outer layer made of a thermoplastic resin (B) that is different from the barrier resin (A); wherein the fuel container is provided with an opening, a cut-out or a groove is provided at an outer surface of the fuel container around the opening, and the cut-out or the groove is covered or filled with a barrier member made of a barrier material (C).

The following is an explanation of the materials that can be used for the above-noted first to fourth fuel containers.

The barrier resins (A) that can be used for a fuel container of the present invention have good barrier properties (liquid and gas barrier properties) with respect to the fuel filled into the fuel container of the present invention. It is preferable that the barrier resin (A) is a thermoplastic resin, because it is molded together with the thermoplastic resin forming the inner and/or outer layer. It is preferable that the gasoline permeation of the barrier resin (A) is at most 100 g·20 μm/m$^2$·day (measured at 40° C. and 65% RH). More preferably, the gasoline permeation of the barrier resin (A) is at most 10 g·20 μm/m$^2$·day, even more preferably it is at most 1 g·20 μm/m$^2$·day, yet even more preferably it is at most 0.5 g·20 μm/m$^2$·day, most preferably it is at most 0.1 g·20 μm/m$^2$·day. The gasoline that was used to measure the gasoline permeation is a model gasoline called "Ref. fuel C" of toluene and i-octane mixed at a volume ratio of 1:1.

It should be noted that the fuel container of the present invention displays an advantageous effect also when the fuel filled into the container is a gasoline containing an alcohol such as methanol, or methyl t-butyl ether (MTBE), that is, so-called oxygen-containing gasoline.

There is no particular limitation concerning the barrier resin, and examples of possible barrier resins include polyvinyl alcohol resins (A1), polyamides (A2), and aliphatic polyketones (A3).

Of these barrier resins (A), polyvinyl alcohol resins (A1) can be obtained by saponifying a homopolymer of a vinyl ester or a copolymer of a vinyl ester and another monomer using, for example, an alkali catalyst.

Vinyl acetate is a typical example of a vinyl ester, but it is also possible to use other fatty add vinyl esters such as vinyl propionate and vinyl pivalate.

The degree of saponification of the vinyl ester component in the polyvinyl alcohol resin is preferably at least 90%, more preferably at least 95%, even more preferably at least 97%, and most preferably at least 99%. When the degree of saponification is less than 90 mol %, there is a possibility that the gas barer property decreases under high humidities. Moreover, for ethylene-vinyl alcohol copolymers (EVOH), the heat stability worsens, and gelled aggregates or fish eyes form more easily on the obtained molded article.

If the polyvinyl alcohol resin is made of a blend of at least two polyvinyl alcohol resins with differing degrees of saponification, then the average value calculated by the weight ratio of the compound is taken as the degree of saponification of the blend. The degree of saponification of such a polyvinyl alcohol resin can be determined by nuclear electromagnetic resonance (NMR) analysis.

As the polyvinyl alcohol resin (A1) used for the present invention, EVOH is preferable, because it can be used for melt extrusion, has good gas barrier properties under high humidities, and has excellent gasoline barrier properties.

The amount of ethylene contained in the EVOH is preferably 5 to 60 mol %. If the amount of ethylene contained in the EVOH is less than 5 mol %, then the gas barrier properties under high humidities decrease, and the melt moldability may worsen as well. Preferably, the amount of ethylene contained in the EVOH is at least 10 mol %, more preferably at least 15 mol %, and most preferably at least 20 mol %. If the amount of ethylene contained in the EVOH exceeds 60 mol %, then it is difficult to obtain sufficient gas barrier properties. Preferably, the amount of ethylene contained in the EVOH is at most 55 mol %, more preferably at most 50 mol %. Preferably, the degree of saponification of the vinyl ester component is at least 85%, more preferably at least 90%, and even more preferably at least 99%. If the degree of saponification of the vinyl ester component is less than 85%, then there is a possibility that the gasoline barrier properties and the heat stability worsen. The amount of ethylene contained in the EVOH and its degree of saponification can be determined by nuclear electromagnetic resonance (NMR) analysis.

When the EVOH is a blend of at least two kinds of EVOH having different ethylene contents or degrees of saponification, the average ethylene content or the average degree of saponification is calculated based on the blend weight ratio. This average value is designated as the ethylene content or the degree of saponification of the blend.

In the case of a blend of two kinds of EVOH, it is preferable that the difference in the ethylene contents between the two kinds of EVOH is 15 mol % or less and that the difference in the degree of saponification is 10% or less. If these conditions fail to be satisfied, there is a possibility that the gasoline barrier properties are harmed. From the viewpoint of obtaining good gasoline barrier properties, the difference between the ethylene contents is more preferably at most 10 mol % and even more preferably at most 5 mol %. Similarly, from the viewpoint of obtaining good gasoline barrier properties, the difference between the degrees of saponification of the two EVOHs is more preferably at most 7% and even more preferably at most 5%.

A small amount of another monomer may be contained in the polyvinyl alcohol resin (A1), especially in EVOH, as a copolymerization component (i.e., as a copolymer unit) within the range not interfering with the purposes of the present invention. Examples of the monomer that may be a copolymerization component include: α-olefins such as propylene, 1-butene, isobutene, 4-methyl-1-pentene, 1-hexene, and 1-octene; unsaturated carboxylic acids such as itaconic acid, methacrylic acid, acrylic acid, and maleic anhydride, and salts, partial or complete esters, nitriles, amides, and anhydrides thereof; vinylsilane compounds such as vinyltrimethoxysilane; unsaturated sulfonic acids and their salts; alkylthiols; and vinylpyrrolidones.

Among the above, when a vinylsilane compound is contained in EVOH as a copolymerization component in an amount of 0.0002 to 0.2 mol %, the consistency in melt viscosity of the EVOH with that of the base resin during coextrusion molding or coinjection molding is improved, allowing for production of a uniformly molded article.

Examples of the vinylsilane compound include vinyltrimethoxysilane, vinyltriethoxysilane, vinyltri(β-methoxyethoxy)silane, γ-methacryloyloxypropyltrimethoxysilane. Among these, vinyltrimethoxysilane and vinyltriethoxysilane are preferable.

EVOH containing a boron compound is also effective in improving the consistency in melt viscosity of EVOH with that of the base resin during coextrusion molding or coinjection molding, allowing for production of a uniformly molded article even in a process of a long term coextrusion or coinjection molding. Examples of the boron compound include boric acids, boric acid esters, borates, and boron hydrides. Specifically, the boric acids include boric acid, orthoboric acid, metaboric acid, and tetraboric acid. The boric acid esters include triethyl borate and trimethyl borate. The borates include alkali metal salts, alkaline-earth metal salts of the boric acids, borax, and the like. Among these compounds, boric acid is preferable.

The content of the boron compound, if contained, is preferably in the range of 20 to 2000 ppm, and more preferably 50 to 1000 ppm, in terms of the boron element. With the addition of boron within this range, torque variation in EVOH during melting by heating is suppressed. If the boron content is less than 20 ppm, this effect is minimal. If it exceeds 2000 ppm, gelation tends to occur resulting in poor moldability.

It is also effective in improving the layer adhesions and compatibility to add an alkali metal salt to the EVOH in an amount of 5 to 5000 ppm in terms of the alkali metal element.

The added amount of the alkali metal salt is more preferably in the range of 20 to 1000 ppm, and more preferably 30 to 750 ppm, in terms of the alkali metal element. The alkali metal in the alkali metal salt includes lithium, sodium, potassium, and the like. Examples of the alkali metal salt include aliphatic carboxylates, aromatic carboxylates, phosphates, and metal complexes of monovalent metals. Specifically, they include sodium acetate, potassium acetate, sodium phosphate, lithium phosphate, sodium stearate, potassium stearate, sodium salt of ethylenediaminetetraacetic acid, and the like. Among these, sodium acetate, potassium acetate, and sodium phosphate are most preferable.

It is also preferable to add a phosphorus compound to the EVOH in an amount of 10 to 500 ppm in terms of the phosphorous element. Adding a suitable amount of a phosphorous compound, it is possible to suppress coloring as well as the generation of gelled aggregates and fish eyes. These improvements due to the addition of a phosphorous compound are particularly striking when a molding operation using resin composition pellets containing EVOH continues for prolonged periods of time and when recovering and recycling of the molded article. The kind of phosphorus compound is not specifically defined, but various kinds of phosphorus-containing acids such as phosphoric acid and phosphorous acid and salts thereof may be used. Phosphates may be in the form of primary phosphates, secondary phosphates, or tertiary phosphates, and the cationic species of the phosphates is not specifically defined. The phosphates are preferably alkali metal salts and alkaline-earth metal salts. Among these, it is preferable to add the phosphorus compound in the form of sodium dihydrogenphosphate, potassium dihydrogenphosphate, disodium hydrogenphosphate, or dipotassium hydrogenphosphate.

Preferably, the included amount of the phosphorous compound is at least 50 ppm, more preferably at least 70 ppm in terms of the phosphorous element. Preferably, the included amount of the phosphorous compound is at most 300 ppm, more preferably at most 200 ppm in terms of the phosphate radical. Including a phosphorous compound in this range, the coloring of the EVOH can be decreased even more, and the gelation will not occur so easily. If the amount of the phosphorous compound is less than 10 ppm, there is a possibility that the coloring during the melt forming process becomes too intense. This tendency becomes especially conspicuous when the thermal history is long, so that recovering and recycling of the molded article becomes difficult. If the amount of the phosphorous compound exceeds 500 ppm, there is a possibility that gelled aggregates and fish eyes tend to occur on the molded article.

It is also possible to add to the EVOH beforehand a thermal stabilizer, an ultraviolet absorber, an antioxidant, a coloring agent, a filler, and other resins (e.g., polyamides and polyolefins) as required. EVOHs containing a boron compound, an alkali metal salt, a phosphorus compound, and the like are commercially available.

The melt flow rate (MFR) of the EVOH used in the present invention (190° C., 2160 g load, according to JIS K7210) is preferably in the range of 0.1 to 100 g/10 min, more preferably 0.05 to 50 g/10 min, and even more preferably 0.1 to 10 g/10 min.

The polyamide resin (A2), which is a barrier resin (A), is a polymer having an amide bond, and there is no particular limitation concerning it. Examples of suitable polyamide resins (A2) include aliphatic polyamide homopolymers such as polycaproamide (Nylon-6), polyundecanamide (Nylon-11), polylaurolactam (Nylon-12), polyhexamethylene adipamide (Nylon-6,6), and polyhexamethylene sebacamide (Nylon-6,12); aliphatic polyamide copolymers such as caprolactam/laurolactam copolymer (Nylon-6/12), caprolactam/aminoundecanoic acid copolymer (Nylon-6/11), caprolactam/ω-aminononanoic acid copolymer (Nylon-6/9), caprolactam/hexamethylene adipamide copolymer (Nylon-6/6,6), and caprolactam/hexamethylene adipamide/hexamethylene sebacamide copolymer (Nylon-6/6,6/6,12); and aromatic polyamides such as a copolymer of adipic acid and metaxylylene diamine and a copolymer of hexamethylenediamine and m- or p-phthalic acid. These polyamides can be used alone or in mixtures of two or more.

Of these polyamides, Nylon-6 is preferable, because of its barrier properties.

The aliphatic polyketone used for the present invention is a carbon monoxide-ethylene copolymer. Suitable carbon monoxide-ethylene copolymers include a copolymer obtained by copolymerizing carbon monoxide and ethylene and a copolymer obtained by copolymerizing carbon monoxide and ethylene as the main components and further containing an unsaturated compound other than ethylene as a copolymer component. Suitable unsaturated compounds other than ethylene include α-olefins with a carbon number of 3 or higher, styrene, diene compounds, vinyl esters, and aliphatic unsaturated carboxylic acids (including their salts and esters). Suitable copolymers include random copolymers and alternating copolymers, and alternating copolymers are preferable. With alternating copolymers, higher barrier properties can be obtained, because their crystallinity is high.

With regard to melt stability, it is preferable that the alternating copolymer contains an unsaturated compound other than carbon monoxide and ethylene as a copolymer component, because the melting point of such a copolymer is high, and thus, the melt-stability of the copolymer increases. As an unsaturated compound that is suitable as the copolymer component, α-olefins are preferable, and examples of suitable α-olefins include propylene, butene-1, isobutene, pentene-1, 4-methylpentene-1, hexene-1, octene-1, and dodecene-1. Among these, α-olefins with a carbon number of 3 to 8 are preferable, and propylene is particularly preferable. It is preferable that the amount of α-olefin is 0.5 to 7 wt % of the resulting polyketone, because this ensures an appropriate crystallinity and melt stability.

For the diene compound of the copolymer component in the polyketone, a diene with a carbon number of 4 to 12 is preferable, and suitable examples include butadiene, isoprene, 1,5-hexadiene, 1,7-octadiene, and 1,9-dekadiene. Suitable vinyl esters for the copolymer component in the polyketone include vinyl acetate, vinyl propionate, and vinyl pivalate. Suitable aliphatic unsaturated carboxylic acids include acrylic acid, methacrylic acid, maleic anhydride, maleic acid, and itaconic acid. Suitable aliphatic unsaturated carboxylic esters include acrylic esters, methacrylic esters, maleic monoesters, maleic diesters, fumaric monoesters, fumaric diesters, itaconic monoesters, and itaconic diesters. The esters include methyl esters, ethyl esters and other alkyl esters. Suitable salts of aliphatic unsaturated carboxylic acids include salts of acrylic acid, salts of maleic acid, and salts of itaconic acid, and these salts can be univalent or divalent metal salts. For the monomers for the copolymer components, it is possible to use not only one kind but also to combine two kinds or more.

A conventional method can be used for the manufacture of the polyketone. For example, one of the method disclosed in U.S. Pat. No. 2,495,286, and Japanese Laid-Open Patent Publication Nos. 53-128690, 59-197427, 61-91226, 62-232434, 62-53332, 63-3025, 63-105031, 63-154737, 1-149829, 1-201333, and 2-67319 can be employed, but there is no particular limitation concerning these methods.

Preferably, the melt flow rate (MFR) of the polyketone used in the present invention is 0.01 to 50 g/10 min (at 230° C. and a load of 2160 g), most preferably 0.1 to 10 g/10 min. When the MFR is in these ranges, the flowability of the resin is excellent, and the moldability too is excellent.

With regard to the gasoline barrier properties, polyvinylalcohol resins and polyamides are preferable for the barrier resin (A) used for the present invention, and EVOH, which is a polyvinylalcohol resin, is especially preferable.

Suitable thermoplastic resins (B) used for the inner layer, outer layer or intermediate layers in a fuel container according to the present invention include olefin homopolymers and copolymers (e.g., linear low-density polyethylene, low-density polyethylene, medium-density polyethylene, high-density polyethylene, ethylene-vinyl acetate copolymer, ethylene-propylene copolymer, polypropylene, propylene-α-olefin copolymer (with an α-olefin with a carbon number of 4 to 20), polybutene, polypentene, and the like), polystyrene, polyvinyl chloride, polyvinylidene chloride, acrylic resin, vinyl ester resin, polyurethane elastomer, polycarbonate, chlorinated polyethylene, chlorinated polypropylene. Of these, it is preferable to use polypropylene, polyethylene, ethylene-propylene copolymer, ethylene-vinyl acetate copolymer, or polystyrene.

If the container of the present invention is a coextrusion blow-molded container, it is preferable to use high-density polyetylene, particularly polyethylene with a density of at least 0.93 g/cm$^3$, for the thermoplastic resin (B). For such a high-density polyethylene, it is possible to select an appropriate product among those commercially available. With regard to the rigidity, impact resistance, moldability, drawdown resistance, and gasoline resistance, it is preferable that the density of the high-polyethylene is 0.95 to 0.98 g/cm$^3$, more preferably 0.96 to 0.98 g/cm$^3$. Moreover, the melt flow rate (MFR) of the high-density polyethylene is preferably 0.01 to 0.5 g/10 min (at 190° C. and a load of 2160 g), more preferably 0.01 to 0.1 g/10 min (at 190° C. and a load of 2160 g).

In the fuel container of the present invention, it is preferable to adhere the barrier layer made of the barrier resin (A) and the inner layer and/or the outer layer made of the thermoplastic resin (B) together with an adhesive layer made of an adhesive resin (D). For such an adhesive resin, a carboxylic acid modified polyolefin is appropriate. The carboxylic acid modified polyolefin is a copolymer of an olefin, particularly an α-olefin, and an unsaturated carboxylic acid or its anhydride. This includes polyolefins having carboxyl groups in the molecule and polyolefins having carboxyl groups in the molecule wherein all or some of the carboxyl groups are present in the form of metal salts. For the carboxylic acid modified polyolefin, a modified polyolefin including a carboxyl group is preferable, which can be obtained by the chemical bonding (for example, obtained by an addition reaction or a graft polymerization) of an unsaturated carboxylic acid or its anhydride to a polyolefin.

Suitable polyolefins serving as the base polymer for the carboxylic acid modified polyolefin include homopolymers such as polyethylene (for example, high-density polyethylene (HDPE), low-density polyethylene (LDPE), linear low-density polyethylene (LLDPE), very low-density polyethylene (VLDPE) and the like), polypropylene, and polybutene; and copolymers (for example, ethylene-vinyl acetate copolymer and ethylene-(meth)acrylate copolymer) of an olefin and a comonomer (such as a vinyl ester, or unsaturated carboxylic ester) that can copolymerize with the olefin. Of these, linear low-density polyethylene, ethylene-vinyl acetate copolymer (including 5 to 55% vinyl acetate) and ethylene-ethyl acrylate copolymer (including 8 to 35% ethyl acrylate) are preferable, and linear low-density polyethylene and ethylene-vinyl acetate copolymer are particularly preferable.

Examples of the aforementioned unsaturated carboxylic acid and its anhydride that can be used for the preparation of the carboxylic acid modified polyolefin include acrylic acid, methacrylic acid, maleic acid, fumaric acid, itaconic acid, monomethyl maleate, monoethyl maleate, and monomethyl fumarate, and of these, in particular acrylic acid and methacrylic acid are preferable. The included amount of unsaturated carboxylic acid is preferably 0.5 to 20 mol %, more preferably 2 to 15 mol %, even more preferably 3 to 12 mol %. Examples of the unsaturated carboxylic anhydride include itaconic anhydride and maleic anhydride, and in particular maleic anhydride is preferable. The included amount of unsaturated carboxylic anhydride is preferably 0.0001 to 5 mol %, more preferably 0.0005 to 3 mol %, even more preferably 0.001 to 1 mol %.

Examples of other monomers that can also be included as copolymer components in the carboxylic acid modified polyolefin are vinyl esters such as vinyl acetate and vinyl propionate; unsaturated carboxylic esters such as methyl acrylate, ethyl acrylate, isopropyl acrylate, isobutyl acrylate, u-butyl acrylate, 2-ethylhexyl acrylate, methyl methacrylate, isobutyl methacrylate, and diethyl maleate; and carbon monoxide.

Examples of metals for the metal salt of the carboxylic acid modified polyolefin are alkali metals such as lithium, sodium, and potassium; alkaline earth metals such as magnesium and calcium; and transition metals such as zinc. The neutralization degree in the metal salt of the carboxylic acid modified polyolefin is preferably less than 100%, more preferably at most 90%, and even more preferably at most 70%. Furthermore, the neutralization degree is preferably at least 5%, more preferably at least 10%, and even more preferably at least 30%.

The melt flow rate (MFR) (at 190° C. and a load of 2160 g) of the carboxylic acid modified polyolefin used for the present invention is preferably 0.01 to 50 g/10 min, more preferably 0.05 to 30 g/10 min, and even more preferably 0.1 to 10 g/10 min. These carboxylic acid modified polyolefins can be used alone or as mixtures of two or more.

Like the barrier resin (A), the barrier materials (C) that can be used for the present invention have good barrier properties (liquid and gas barrier properties) with respect to the fuel filled into the fuel container. Preferably, the gasoline permeation (measured at 40° C. and 65% RH) of the barrier material (C) used for the present invention is at most 0.1 times the gasoline permeation (measured at 40° C. and 65% RH) of the thermoplastic resin (B). More preferably, the gasoline permeation of the barrier material (C) is at most 0.05, more preferably at most 0.01 times the gasoline permeation of the thermoplastic resin (B).

If the gasoline permeation amount of the barrier material (C) exceeds 0.1 times the gasoline permeation amount of the thermoplastic resin (B), then there is a possibility that its capability as a barrier material becomes insufficient, and that the amount of fuel permeating through the pinch-off parts and the openings of the tank body cannot be decreased sufficiently.

Preferably, the gasoline permeation amount of the barrier material (C) used for the present invention is at most 400 g·20µ/m²·day (measured at 40° C. and 65% RH). If the gasoline permeation amount exceeds 400 g·20µ/m²·day (measured at 40° C. and 65% RH), then there is a possibility that its capability as a barrier material becomes insufficient, and that the amount of fuel permeation through the pinch-off parts and the openings of the tank body cannot be decreased sufficiently. More preferably, the gasoline permeation amount of the barrier material (C) is at most 100 g·20µ/m²·day, even more preferably at most 50 g·20µ/m²·day, particularly preferably at most 10 g·20µ/m²·day, and most preferably at most 1 g·20µ/m²·day (all measured at 40° C. and 65% RH).

For the barrier material (C), it is suitable to use at least one selected from the group consisting of metal foil, epoxy resin, polyvinylidene chloride resin, polyvinylalcohol resin, polyamide resin, polyester resin, and fluorocarbon resin. Of these, it is preferable to use metal foil because of its easy handling. In particular, it is preferable to employ a laminate obtained by the application of an adhesive material that is adhesive with respect to the body of the container onto the metal foil, like an aluminum adhesive tape. There are no particular limitation concerning the metal foil, and it is possible to use a metal vapor deposition film or a vapor deposition film of a metal oxide, but with regard to availability and handling, an aluminum foil is preferable.

If the barrier material (C) is a thermoplastic resin, then the same resin as for the barrier resin (A) can be used for the barrier material (C). As long it does not obstruct the object of the present invention, it is also possible to blend this barrier material (C) with suitable amounts of other thermoplastic resins to improve its mechanical strength and moldability. Suitable other thermoplastic resins include any kinds of polyolefins (such as polyethylene, polypropylene, poly-1-butene, poly-4-methyl-1-pentene, ethylene-propylene copolymer, copolymer of ethylene and α-olefin with a carbon number of at least four, copolymer of polyolefin and maleic anhydride, ethylene-vinyl ester copolymer, ethylene-acrylate copolymer as well as modified polyolefins obtained by graft modification of these polymers with unsaturated carboxylic acids or derivatives thereof, polystyrene, polyacrylonitryl, and the like.

The following is an explanation of a first to fourth fuel container in accordance with the present invention.

The first fuel container of the present invention is a coextrusion blow-molded container. The ratio (X/Y) of the distance (X) between end portions of the barrier layer at the pinch-off part of the container and the average thickness (Y) of the container body is at least 1/10000 and at most 1/10. The ratio (Y1/Y) of the total thickness (Y1) of the layers of the container body that are located on the inside with respect to the barrier layer and the average thickness (Y) of the container body is at least 3/10 and at most 7/10. Because of this configuration, the container has favorable barrier properties, and has the advantages of an excellent dart-impact strength and has little deformation (details will be explained below).

The aforementioned "distance (X) between end portions of the barrier layer at a pinch-off part of the container" refers to the distance between the opposing end portions of the barrier layer where the barrier layers are closest to one another in a cross-section taken in the thickness direction of the container through the the pinch-off part, as shown in FIG. 1. "Average thickness (Y) of the container body" means the average thickness of the body of the fuel container of the present invention. "Total thickness (Y1) of the layers of the container body that are located on the inside with respect to the barrier layer" in the container body refers to the thickness of the layers that are located on the inside with respect to the barrier layer in a cross-section taken in the thickness direction of the container through the container body as shown in FIG. 1.

As mentioned above, in the first fuel container of the present invention, the lower limit for the ratio (X/Y) of the distance (X) between the end portions of the barrier layer and the average thickness (Y) of the container body is 1/10000, and it is preferably 1/5000, more preferably 1/1000. When the ratio (X/Y) is less than 1/10000, the strength of the pinch-off part becomes insufficient, and the impact resistance of a coextrusion blow-molded container with such a pinch-off part becomes insufficient.

The upper limit for the ratio (X/Y) of the distance (X) between the end portions of the barrier layer and the average thickness (Y) of the container body is 1/10, preferably 1/20, more preferably 1/40, and even more preferably 1/100. When this ratio (X/Y) exceeds 1/10, the amount of the content permeating through the pinch-off part cannot be suppressed sufficiently. If this ratio (X/Y) exceeds 1/10, deformation tends to occur more easily in the coextrusion blow-molded container after the molding (see Comparative Examples 1 and 2 of this specification).

There is no particular limitation concerning the method to ensure that the pinch-off part has the above-mentioned favorable ratio (X/Y), but it is preferable to use suitable molds and carry out the molding with a suitable mold cramping force.

FIG. 4 shows several schematic views of examples of molds having a pinch-off part forming section and the pinch-off parts obtained with these molds. The mold design for obtaining pinch-off in the above-mentioned preferable ranges of the ratio (X/Y) is discretionary, but FIGS. 4a and 4d show preferable examples of molds having a pinch-off part forming section.

To control the ratio (X/Y), it is also preferable that the MFR of the resin of the barrier layer (MFRbarrier) and the MFR of the resin of the innermost layer (MFRinside) satisfy the following relation:

$$8 \leq MFR\text{barrier}/MFR\text{inside} \leq 100 \tag{1}$$

Here, MFRbarrier and MFRinside both refer to values measured at 190° C. and a load of 2160 g. However, if the melting point is about 190° C. or higher, then the measurement is carried out at a load of 2160 g at a plurality of temperatures at or above the melting point, the inverses of the absolute temperatures are marked on the horizontal axis and the logarithm of the MFR is plotted on the vertical axis in a semi-logarithmic graph, and the MFR is determined by extrapolation to 190° C.

Preferably, MFRbarrier/MFRinside is at least 10, more preferably at least 15. MFRbarrier/MFRinside is less than 8, there is a possibility that the ratio (X/Y) becomes less than 1/1000 due to flowing of the resin for the innermost layer during the molding.

Preferably, MFRbarrier/MFRinside is at most 80, more preferably at most 70. If MFRbarrier/MFRinside exceeds 100, there is a possibility that the consistency of the viscosities of the resin of the barrier layer and the resin of the innermost layer becomes poor, and that the moldability of the coextrusion blow-molded container becomes unsatisfactory.

As mentioned above, in the first fuel container of the present invention, the ratio (Y1/Y) of the total thickness (Y1) of the layers of the container body that are located on the inside with respect to the barrier layer and the average thickness (Y) of the container body is at least 3/10 and at most 7/10. Preferably, this ratio (Y1/Y) is at least 32/100, and more preferably at least 35/100. Also, preferably this ratio (Y1/Y) is at most 65/100, and more preferably at most 60/100. If the ratio (Y1/Y) is below 3/10, the impact resistance at the pinch-off part becomes unsatisfactory, and if the ratio (Y1/Y) exceeds 7/10, the barrier properties become unsatisfactory. By keeping the ratio (Y1/Y) in these ranges, sufficient barrier properties as well as sufficient impact resistance can be attained.

Among the related art, a technology is disclosed (Japanese Laid-Open Patent Publication No. 9-29904) in which the barrier layer is arranged closer to the inner layer to improve the gas barrier properties of the fuel tank. Example 6 of this publication describes a coextrusion blow-molded bottle with a thickness ratio (I/O)=4/96, wherein "I" denotes the total thickness of all layers that are located on the inside with respect to the barrier layer and "O" denotes the total thickness of all layers that are located on the outside with respect to the barrier layer. With such a bottle, the ratio (X/Y) of the distance (X) between end portions of the barrier layer at the pinch-off part and the average thickness (Y) of the container body is almost always at least 1/10000 and at most 1/10, obtaining high barrier properties, even without taking any exceptional measures with regard to the molds or the molding conditions when cutting off the parison. However, in this coextrusion blow-molded bottle, the total thickness of the layers on the inside with respect to the barrier layer is insufficient at the pinch-off part (see FIG. 3). The strength of the pinch-off part is maintained mainly by fusion of the layers located on the inside with respect to the barrier layer at the pinch-off part. Consequently, in this configuration, the thickness of the layer located inside the barrier layer at this portion is extraordinary thin, and thus the impact resistance at the pinch-off part becomes unsatisfactory (see Comparative Example 4 of this specification).

In the first fuel container of the present invention, the ratio (H/L) of the length (L) of the pinch-off part and the height (H) of the pinch-off part shown in FIG. 1 is preferably set to 0.1 to 3. The lower limit of this ratio (H/L) is preferably 0.2, and more preferably 0.3. The upper limit of this ratio (H/L) is preferably 2.5, and more preferably 2. Keeping the ratio (H/L) within these ranges is preferable, because this achieves both good barrier properties and impact resistance. If the ratio (H/L) is less than 0.1, there is a possibility that the suppression of fuel in the container permeating through the pinch-off part becomes insufficient, and if the ratio (H/L) is higher than 3, then there is a possibility that the impact resistance of the pinch-off part is not high enough.

There is no particular limitation concerning the method with which the ratio (H/L) is kept in these preferable ranges. If the coextrusion blow-molded container is small, the parison is often pinched off with the molds, so that it is preferable to arrange the molds appropriately. If the coextrusion blow-molded container is large, such as a fuel tank for a vehicle, the parison is mostly held and press-sealed with the molds, but not cut off with the molds, and the portion that sticks out from the container surface is often cut off with a cutter at the desired height. Therefore, to keep the ratio (H/L) in a preferable range, it is preferable to adjust the cutter or the like to an appropriate cutting position.

Thus, although it used to be difficult to achieve both good barrier properties and impact resistance at the pinch-off part, a fuel container with excellent barrier properties and impact resistance can be obtained by employing this configuration of a first fuel container of the present invention.

The mold temperature when the first fuel container of the present invention is produced by coextrusion blow-molding is preferably 5 to 30° C., more preferably 10 to 30° C., and even more preferably 10 to 20° C. If the mold temperature is less than 5° C., dew forms easily on the mold surface, and there is a possibility that the outward appearance of the molded article is poor. On the other hand, if the mold temperature exceeds 30° C., there is a possibility that the productivity decreases due to the long cooling times of the resin, and if the resin cannot be cooled sufficiently, there is a possibility that deformation occurs after the coextrusion blow-molding.

As mentioned above, the first fuel container of the present invention is a coextrusion blow-molded fuel container, which is a layered product having a barrier layer made of a barrier resin (A) and an outer layer and an inner layer made of a thermoplastic resin (B). There is no particular limitation concerning the layering structure, and considering moldability and cost factors, typical examples of suitable layering structures include thermoplastic resin layer/barrier layer/thermoplastic resin layer and thermoplastic resin layer/adhesive resin layer/barrier layer/adhesive resin layer/thermoplastic resin layer. The thermoplastic resins for the inner and the outer layers can be identical resins or different kinds of resins.

With regard to the rigidity, impact resistance, moldability, drawdown resistance, and gasoline resistance, it is preferable that the layering structure used for the fuel container is high-density polyethylene/adhesive resin layer/barrier layer/adhesive resin layer/high-density polyethylene.

When the coextrusion blow-molded container is produced, the formation of burr is unavoidable. It is possible to remelt this burr together with unacceptable pieces of products and use it for a recovered layer. Forming such recovered layers decreases the loss of resin used for the manufacture of the container and enhances the recycling of the resins. For the recovered layer, it is possible to use a resin or a resin mixture, for example, obtained by remelting a multilayered structure made of a thermoplastic resin and a barrier layer (and possibly an adhesive resin layer). Generally, the mechanical strength of such a recovered layer is often weaker than that of a layer made of a thermoplastic resin of a single kind. If the container is subjected to an impact from the outside, a corresponding stress acts on the side of the inner layers of the container, generating deformation of the container, which may in some cases even lead to fractures. Therefore, it is particularly preferable that the recovered layer is arranged on the outside with respect to the barrier layer. Furthermore, if large amounts of resin have to be recycled, such as when a lot of burr is formed, it is recommendable to arrange recovered layers on both sides of the barrier layer.

With the first coextrusion blow-molded fuel container of the present invention, the barrier properties at the pinch-off part do not deteriorate, and the dart-impact strength does not become insufficient due to the failure to achieve a sufficient contact strength.

Figure 6:
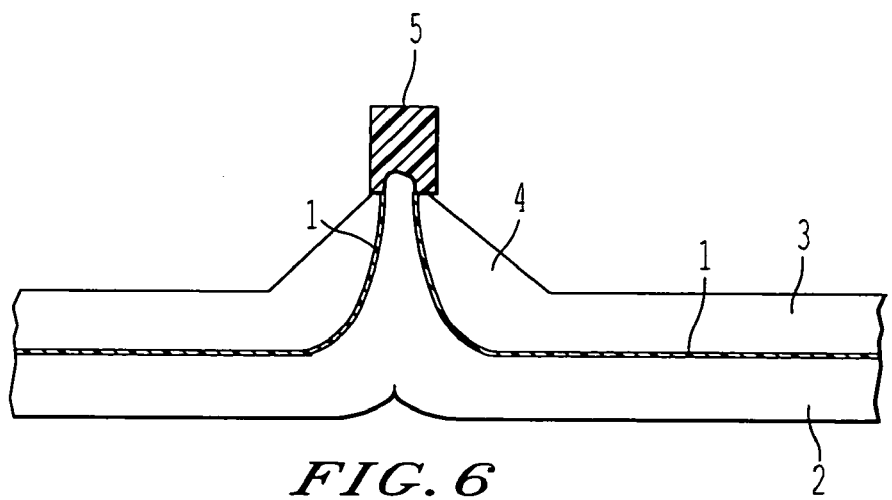
FIG. 6 is a schematic view of an embodiment, in which a barrier member covers a cutting face of the pinch-off part of the fuel container.

As mentioned above, the second fuel container of the present invention is a coextrusion blow-molded fuel container, which is a layered product having at least a barrier layer made of a barrier resin (A), and an inner layer made of a thermoplastic resin (B) that is different from the barrier resin (A). The cutting face of the pinch-off part of this container is covered by a barrier member made of a barrier material (C). FIG. 6 is a schematic view showing the pinch-off part of the second fuel container. This container is made of a layered product having a barrier layer 1, an inner layer 2 and an outer layer 3, and a pinch-off part 4 is covered by a barrier member 5.

If the pinch-off part of the fuel container of the present invention is covered with a barrier member, the covering of the pinch-off part can be partial or complete. With regard to obtaining sufficient gasoline barrier properties, it is preferable that at least the cutting face of the layer (here, this is the inner layer 2) surrounded by the barrier layer (in FIG. 6, between end portions of barrier layer 1 and 1) is covered by the barrier member 5, as shown in FIG. 6. Covering this portion completely effectively suppresses the permeation of fuel through the pinch-off part. It is also recommendable to cover the entire cut-off face of the pinch-off part.

As mentioned above, the third fuel container of the present invention is a layered product having at least a barrier layer made of a barrier resin (A), and an outer layer made of a thermoplastic resin (B) that is different from the barrier resin (A). In the opening portion provided in the body of the container, the cutting face of the layer located on the outside with respect to the barrier layer is covered with a barrier member.

Figure 7:
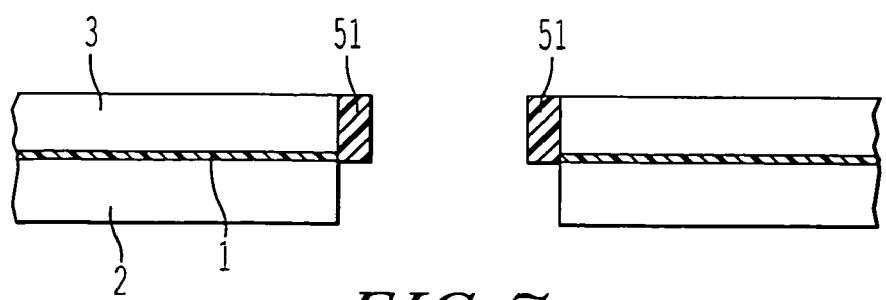
FIG. 7 is a schematic view showing an opening in the body of the fuel container, in which the cutting face of the layer located on the outside with respect to the barrier layer is covered with a barrier member.

FIG. 7 is a schematic view showing an example of the opening portion of such a container. This container is made of a layered product having a barrier layer 1, an inner layer 2 and an outer layer 3. In the opening portion provided in the body of the container, at least the cutting face of the layer located on the outside with respect to the barrier layer 1 (here, this is the outer layer 3) is covered with a barrier member 51. Covering completely at least this portion of the entire cutting face effectively suppresses the permeation of fuel through the opening provided in the body of the container. It is also possible to cover the entire cutting face of the opening of the layered product.

As shown in FIGS. 8*a* and 8*b*, the same effect can be attained by mounting a component for fuel containers 61 made of the barrier material (C) on the opening portion provided in the body of the container as a barrier member to cover at least the cutting face of the outer layer 3 of the container.

In the second and third fuel containers of the present invention, there is no particular limitation concerning the method for covering the cutting face of the pinch-off part of the container or the opening portion provided in the body of the fuel container with a barrier member. Suitable methods include applying a barrier material (C) having adhesiveness with respect to the body of the fuel container to the cutting face of the pinch-off part and solidifying or drying the same, and as a result, covering the pinch-off part with a barrier member; applying to the cutting face an adhesive having adhesiveness with respect to both the body of the fuel container and the barrier material, and then covering the cutting face with a barrier member; uniting the barrier material (C) with a substrate having adhesiveness with respect to the fuel container, and then covering the cutting face with the resulting barrier member (such as aluminum adhesive tape for example); bonding a molded article (barrier member) made of the barrier material (C) to the cutting face by thermal fusion or via an adhesive to cover the cutting face. There is no particular limitation concerning the molded article made of the barrier material (C), but it is preferable to use a film, a sheet, a component for fuel containers, or the like.

Of these covering methods, uniting the barrier material (C) with a substrate having adhesiveness with respect to the fuel container, and then covering the cutting face with the resulting barrier member (such as aluminum adhesive tape for example); and bonding a molded article made of the barrier material (C) to the cutting face by thermal fusion or via an adhesive to cover the cutting face are preferable with regard to the facility with which they can be carried out.

As mentioned above, the fourth fuel container of the present invention is a layered product having at least a barrier layer made of a barrier resin (A), and an outer layer made of a thermoplastic resin (B) that is different from the barrier resin (A). An opening is provided in the body of the container, and a cutout or a groove is provided in the outer surface of the container around this opening. The cutout or groove are covered or filled with the barrier material (C).

The following is an explanation of such a fourth fuel container that is provided with a cutout around the opening. As shown in FIG. 9*a*, a portion of the layered product around the opening provided in the body of the container, including the material at the opening, is cut away, forming a cutout 71. The inner surface of this cutout is covered with a barrier material, for example by applying (e.g., adhering) a single-layer or multilayered sheet made of the barrier material (C) to it. Alternatively, the inner surface is covered with a barrier member by mounting a molded article made of the barrier material (C). For example, a component for fuel containers 62 is mounted by thermal fusion and the inner surface of the cutout is covered, as shown in FIGS. 9*a* and 9*b*. The molded article made of the barrier material (C) can be, for example, a single-layer sheet-shaped molded product made of the barrier material (C), or a multilayered structure having at least one layer made of the barrier material (C). Covering the cutting face in this manner, in particular by mounting an article by thermal fusion is, with respect to workability, preferable to the method for covering the cutting face shown in FIG. 8.

The depth of the cutout can be chosen as appropriate, but a depth of 0.1 to 0.8 times the average thickness (Y) of the container body is preferable. More preferably, the depth of the cutout is at least 0.2 times, even more preferably at least 0.3 times the average thickness (Y) of the container body. Furthermore preferably, the depth of the cutout is at most 0.75 times, even more preferably at most 0.7 times the average thickness (Y) of the container body. If the depth of the cutout is less than 0.1 times the average thickness (Y) of the container body, there is a possibility that the effect of improving the barrier properties becomes unsatisfactory. Moreover, if the depth of the cutout exceeds 0.8 times the average thickness (Y) of the container body, there is a possibility that the mechanical strength of the fuel container body around the cutout becomes unsatisfactory.

With regard to the mechanical strength around the opening of the container body, it is preferable that the depth of the cutout is at least 0.2 and less than 1 times the total thickness (Y2) of the layers located on the outside with respect to the barrier layer 1. More preferably, the depth of the cutout is at least 0.3, even more preferably at least 0.5 times the total thickness (Y2). If the depth of the cutout is less than 0.2 times the total thickness (Y2), there is a possibility that the effect of improving the gasoline barrier properties becomes insufficient. With regard to obtaining thermal fusibility with the molded article made of the barrier material (C), the depth of the cutout is more preferably at most 0.999, even more preferably at most 0.995, and particularly preferably at most 0.99 times the total thickness (Y2).

When particularly much weight is given to the gasoline barrier properties, it is preferable that the depth of the cutout is equal to or more than the total thickness (Y2). In this configuration, the barrier member blocks the fuel permeation path through the layer located on the outside with respect to the barrier resin (A) without a gap, so that extremely good gasoline barrier properties can be obtained. If the depth of the cutout is equal to the total thickness (Y2), then the barrier layer is exposed, so that when the molded article made of the barrier material (C) is thermally fused to cover the cutting face of the cutout, there is a possibility that the thermal fusibility is insufficient. On the other hand, if the depth of the cutout exceeds the total thickness (Y2), there is a possibility that the mechanical strength of the periphery of the cutout becomes insufficient.

In another embodiment of the fourth fuel container of the present invention, a groove is provided in the outer surface of the container around the opening, and this groove is filled or covered with a barrier member.

This groove is provided at an arbitrary position around the opening, and it is preferable that the groove is arranged so as to enclose the opening completely. With such a configuration, the permeation path can be blocked completely, which enhances the gasoline barrier properties. If the groove encloses the opening completely, it is preferable that the area of the portion enclosed by the groove (area including the opening) is 1.1 to 50 times the area of the opening. With regard to the processability for making the groove, the area of the portion enclosed by the groove is more preferably at most 30, even more preferably at most 10, and particularly preferably at most 5 times the area of the opening. Furthermore, it is preferable that the groove enclosing the opening is circular, because this makes it easy to make a groove that encloses the opening completely.

The inner surface of the groove is covered by a barrier member, or the entire groove is filled with a barrier member. There is no particular limitation concerning the method for such covering or filling.

Suitable methods for covering the inner surface of the groove with a barrier member include applying to the inner surface of the groove an adhesive having adhesiveness with respect to both the fuel container body and the barrier member and then covering the inner surface of the groove with a barrier member; covering the inner surface of the groove with a layered product (such as aluminum adhesive tape) made of the barrier material (C) and an adhesive; applying to the inner surface of the groove the barrier material (C) having adhesiveness with respect to the fuel container and then solidifying or drying it.

Figure 10A:
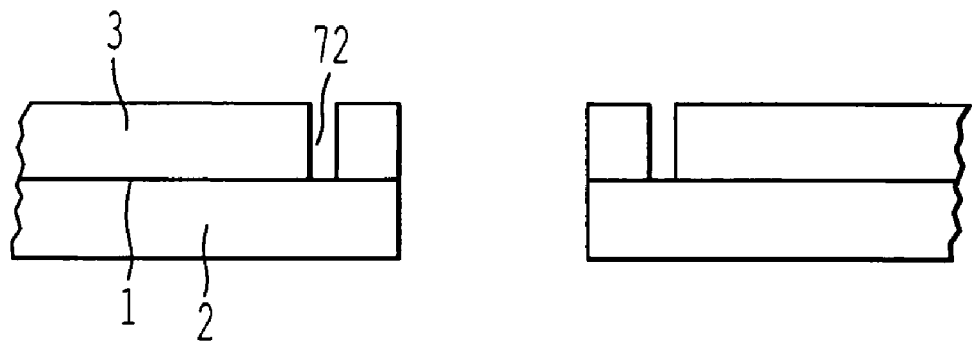
FIG. 10a, FIG. 10b and FIG. 10c illustrate the steps around the opening in the body of the fuel container with a barrier material (C), and mounting a component for fuel containers.
Figure 10B:
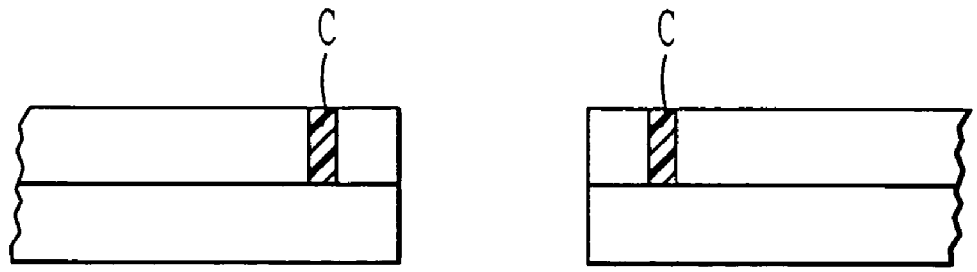
Figure 10C:
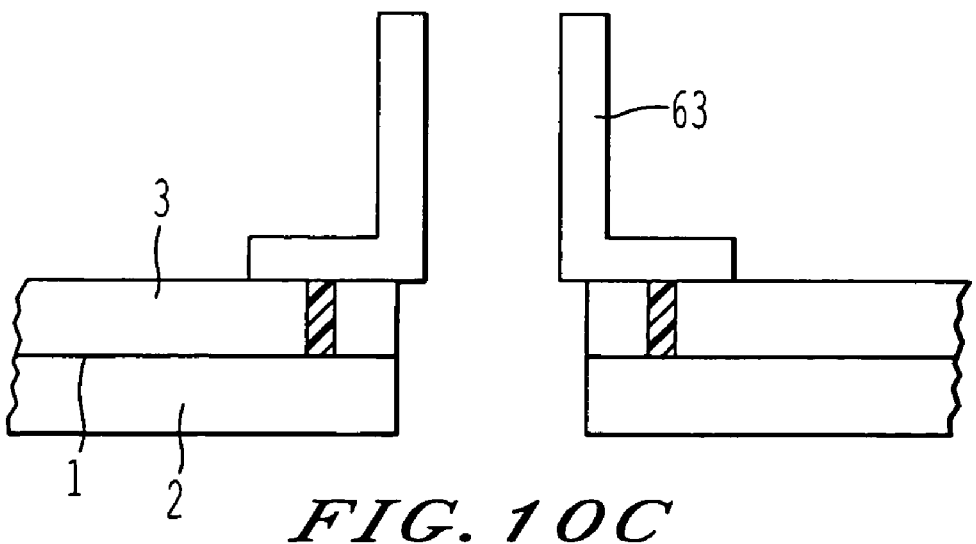

Suitable methods for filling the groove with a barrier material include filing into the groove 72 a barrier material (C) having adhesiveness with respect to the fuel container body, and solidifying or drying it, as shown in FIGS. 10a and 10b. In this case, the gasoline barrier properties, which are the effect of the present invention, can be attained even if the barrier material (C) is bonded by pseudo-adhesion to the outer layer 3 and the barrier layer 1. However, with regard to mechanical strength, it is preferable that the barrier material (C) adheres firmly to the fuel tank body (that is, the outer layer 3 and the barrier layer 1). If the method employed is filling the barrier material (C) having adhesiveness with respect to the fuel container body into the groove and solidifying or drying it, then it is particularly preferable to mount a component for fuel containers 63 made of the barrier material (C) to the opening, as shown in FIG. 10c, because this makes it easier to achieve sufficient gasoline barrier properties. The barrier material (C) constituting the component for fuel containers 63 can be the same or can be different from the barrier material (C) filled into the groove 72. The component for fuel containers 63 can be a single-layer molded product made of the barrier material (C), or a multilayered molded product having at least one layer made of the barrier material (C).

As the method for filling the groove with a barrier material (C), a method in which a molded article made of the barrier material (C), for example a component for fuel containers, is thermally fused with the groove is also recommended.

Thus, the fourth fuel container, which is provided with a cutout or a groove whose inner surface is covered or filled, is preferable to the second fuel container, in which the cutting face of the opening is covered directly by the barrier member, because it avoids direct contact between the barrier member and the fuel. The barrier member shows good barrier properties with respect to the fuel inside the container, so that deterioration due to direct contact hardly occurs, but when it is at a flow path surface of the fuel, there is a possibility that the barrier member peels off due to physical forces over long usage periods.

The method of thermally fig components for fuel containers made of the barrier material (C) into the cutout or the groove is preferable to the method, in which a component for fuel containers made of the barrier material (C) is thermally fused with the cutting face of the opening (see FIG. 8). This is because in the former method, thermal fusion can be carried out more easily.

It is preferable that the depth of the groove is 0.1 to 0.8 times the average thickness (Y) of the container body. Preferably, the depth of the groove is at least 0.2 times, more preferably at least 0.3 times the average thickness (Y) of the container body. Preferably, the depth of the groove is at most 0.75 times, more preferably at most 0.7 times the average thickness (Y) of the container body. If the depth of the groove is less than 0.1 times the average thickness (Y) of the container body, there is a possibility that the gasoline barrier properties cannot be improved sufficiently. Furthermore, if the depth of the groove is more than 0.8 times the average thickness (Y) of the container body, there is a possibility that the mechanical strength of the fuel container body at the periphery of the groove becomes insufficient.

With regard to the mechanical strength at the periphery of the opening, it is preferable that the depth of the groove is at least 0.2 and less than 1 times the total thickness (Y2) of the layers located on the outside with respect to the barrier layer, more preferably at least 0.3, even more preferably at least 0.5 times the total thickness (Y2) of the layers on the outside with respect to the barrier layer. If the depth of the groove is less than 0.2 times the total thickness (Y2) of the layers on the outside with respect to the barrier layer, there is a possibility that the gasoline barrier properties cannot be improved sufficiently. Considering the thermal fusability with molded articles made of the barrier material (C), the depth of the groove is preferably at most 0.999, more preferably 0.995 times the total thickness (Y2). When giving particular weight to the thermal fusability, the depth of the groove is preferably at most 0.99 times the total thickness (Y2).

When giving particular weight to the gasoline barrier properties, it is preferable that the depth of the groove is equal to or more than the total thickness (Y2). With such an embodiment, the permeation path of the fuel through the layers located on the outside with respect to the barrier layer can be blocked without a gap, so that extremely good gasoline barrier properties can be obtained. If the depth of the cutout is equal to the total thickness (Y2), then the barrier layer is exposed. Therefore, when the molded article made of the barrier material (C) is thermally fused to cover the cutting face of the groove, there is a possibility that the thermal fusibility is insufficient. On the other hand, if the depth of the cutout exceeds the total thickness (Y2), there is a possibility that the mechanical strength of the periphery of the opening becomes insufficient. It should be noted that the barrier layer can also be configured as two or more layers, and in such a case, the total thickness of the layers that are outside the outermost barrier layer is regarded as the total thickness (Y2).

There is no particular limitation concerning the configuration of the layered article constituting the second to fourth fuel container of the present invention, and considering moldability and costs, typical examples of suitable configurations include (inside) B/A/B (outside), (inside) B/Tie/A (outside), (inside) B/Tie/A/Tie/B (outside), (inside) B/Tie/A/Tie/A/Tie/B (outside), wherein "A" denotes barrier layers made of the barrier resin (A), "B" denotes layers made of the thermoplastic resin (B), and "Tie" denotes adhesive layers made of the adhesive resin (D). When there are two or more barrier layers, layers made of the thermoplastic resin (B) or adhesive layers, then these layers can be made of the same resin or of different resins.

When the fuel container of the present invention is used for a fuel tank of motor vehicles, then the layering structure (inside) B/Tie/A/Tie/B (outside) is particularly preferable with regard to rigidity, impact resistance, moldability, draw-down resistance, and gasoline resistance.

There is no particular limitation concerning the thickness of the layers of the fuel container of the present invention, but considering gasoline barrier properties, mechanical strength, and manufacturing costs of the fuel container, it is preferable that the thickness of the barrier layer is 0.1 to 20% of the total thickness of all layers. The thickness of the barrier layer is preferably at least 0.5%, and more preferably at least 1% of the total thickness of all layers. Furthermore, the thickness of the barrier layer is preferably at most 15%, and more preferably at most 10% of the total thickness of all layers. If the thickness of the barrier layer is less than 0.1% of the total thickness of all layers, then there is a possibility that the gasoline barrier properties become insufficient. When the thickness of the barrier layer exceeds 20%, then there is a possibility that the mechanical strength is insufficient, and that the costs are higher. If there is a plurality of barrier layers, then the total thickness of barrier layers is regarded as the thickness of the barrier layer.

Considering the suppression of the amount of fuel permeating through the cutting face of the opening provided in the body of the container, it is preferable that the ratio (Y2/Y) of total thickness (Y2) of the layers located on the outside with respect to the barrier layer and the average thickness (Y) of the container body is at most 45/100. More preferably, the ratio (Y2/Y) is at most 40/100, even more preferably 35/100, and particularly preferably at most 30/100. As shown in FIG. 5, the fuel in the container permeates to the outside through the layers located on the outside with respect to the barrier layer, so that by reducing the total thickness (Y2) of the layers located on the outside with respect to the barrier layer, the amount of fuel permeating from the fuel container can be made relatively small.

There is no particular lower limit with regard to the ratio (Y2/Y), and the barrier layer can also be the outermost layer. However, fuel containers in which the barrier layer is the outermost layer may be not preferable with regard to mechanical strength and thermal fusability with components that will be attached to the container. Therefore, in the fuel container of the present invention, it is preferable that the container has a barrier layer as an intermediate layer, and has an inner layer and an outer layer made of the thermoplastic resin (B). In this case, the ratio (Y2/Y) is preferably at least 1/100, more preferably at least 5/100.

With regard to the suppression of fuel permeation, it is preferable to blend barrier resin (A) into the thermoplastic resin (B) for the outer layer. By employing such a configuration, a certain mechanical strength can be attained, the thermal fusability with components for fuel containers can be improved, and a fuel container with even better gasoline barrier properties can be obtained. The outer layer can be a single layer or multiple layer structure, and when it is a multiple layer structure, then, with regard to the gasoline barrier properties, it is preferable that the thermoplastic resin layer into which the barrier resin (A) is blended is the outermost layer.

Like in the first fuel container, in the second, third and fourth fuel container too, the occurrence of burr is unavoidable when producing the container especially by blow-molding. As in the first fuel container, it is possible to remelt this burr together with unacceptable pieces of products and use it for a recovered layer.

It is preferable to mount a component for fuel containers on the opening portion provided in the body of the fuel container of the present invention. To be specific, suitable component for fuel containers includes fuel tank connectors, fuel tank caps, and fuel tank valves, but there is no limitation concerning these.

To sufficiently exhibit the effect of the present invention, it is preferable that the component for fuel containers has good barrier properties. Suitable components for fuel containers include components made of metal and components made of a resin composition having good barrier properties (Japanese Patent Application Nos. 11-172151 and 11-172152).

In a particularly preferable embodiment, the second to fourth fuel container is a coextrusion blow-molded fuel container having an inner layer and an outer layer made of the thermoplastic resin (B) and a barrier layer, wherein the pinch-off part is covered by a barrier member, and the cutting face of an opening in the body is covered with a barrier member. Even more preferably, a component for fuel containers with good barrier properties is mounted on this fuel container.

The resulting fuel container has very good fuel barrier properties, so that it can be used as a fuel container for which particularly high barrier properties are demanded, such as a gasoline tank for a vehicle.

EXAMPLES

The following is an explanation of the present invention by way of examples. It should be understood that the present invention is in no way limited by these examples. The following methods were used for the various tests in these examples.

(1) Fuel Permeation Amount at the Pinch-Off Part

A film with the structure 60 μm polyethylene/12 μm aluminum foil/160 μm polyethylene was heat-laminated with a 170° C. heating iron onto the surface (except for the pinch-off part) of a 500 ml tank obtained by molding, thereby preventing the permeation of gasoline at all portions but the pinch-off part. Then, 400 ml of Ref. fuel C (toluene/isooctane=1/1) was filled as model gasoline into this tank, and the opening was sealed with a film with the structure 60 μm polyethylene/12 μm aluminum foil/60 μm polyethylene. The tank was shelved for three months at 40° C. and 65% RH. This experiment was carried out on five 500 ml tanks, the change of the weight of the tanks before and after the shelf test was determined, and the average value taken as the permeation amount through the pinch-off part.

(2) Impact Resistance

A 500 ml tank obtained by molding was filled with 400 ml anti-freezing fluid and shelved for three days at −40° C. Then the tank was dropped onto an iron plate from 1 m height with its pinch-off part facing downward (n=5). The state of the pinch-off part was evaluated on a scale of four values, and of the five tanks, the second worst state of the pinch-off part was taken as the evaluation result:

Class A: No deformation at all.
Class B: Slight deformation but no cracks.
Class C: Pinch-off part shows small cracks.
Class D: Pinch-off part shows large cracks (3) Deformation of the Tank It was evaluated visually whether the tank shows deformation.

(4) Evaluation of the Fuel or Gasoline Permeation Amount through the Material Used in Examples (4.1) Evaluation of the Fuel Permeation Amount of the Barrier Resin (A)

A specimen of a layered product including a layer of barrier resin (A) was prepared as explained below, the fuel permeation amount of this layered product was determined, and converted into the permeation amount of barrier resin of a predetermined thickness.

For the thermoplastic resin (B), the high-density polyethylene (HDPE) BA-46-055 (having a density of 0.970 g/cm$^3$, and a MFR of 0.03 g/10 min at 190° C. and 2160 g) by Paxon was used; for the adhesive resin (D), ADMER GT-6A (having a MFR of 0.94 g/10 min at 190° C. and 2160 g) by Mitsui Chemicals, Inc. was used. The barrier resin (A), the thermoplastic resin (B) and the adhesive resin (D) were given into separate extruders, and a coextrusion sheet with a total thickness of 120 μm having the structure high-density polyethylene/adhesive resin/barrier resin (A)/adhesive resin/high-density polyethylene (film thickness 50 μm/5 μm/10 μm/5 μm/50 μm) was obtained by extrusion molding. In the above coextrusion sheet molding, the high-density polyethylene was extruded from an extruder (barrel temperature: 170 to 210° C.) having a uniaxial screw of 65 mm diameter and L/D=24, the adhesive resin was extruded from an extruder (barrel temperature: 160 to 210° C.) having a uniaxial screw of 40 mm diameter and L/D=22, and the barrier resin (A) was extruded from an extruder (barrel temperature: 170 to 210° C.) having a uniaxial screw of 40 mm diameter and L/D=22 into a feed-block-type die (600 mm width and temperature adjusted to 210° C.) to obtain a coextrusion sheet (a1).

One side of the coextrusion sheet (a1) was covered with aluminum adhesive tape (product by FP Corp., trade name "Alumi-seal"; fuel permeation amount of 0 g·20 μm/m$^2$·day), thereby obtaining the aluminum-covered sheet (b1).

Both the coextrusion sheet (a1) and the aluminum-covered sheet (b1) were cut into pieces of 210 mm×300 mm size. Then these pieces were folded in the middle so their size became 210 mm×150 mm, and using the Heat Sealer T-230 by Fuji Impulse Co., pouches were prepared by heat-sealing of any two sides with dial 6 so that the seal width becomes 10 mm. Thus, pouches (a2) made of the coextrusion sheet only and aluminum-covered pouches (b2) were obtained. The aluminum-covered pouches (b2) were made so that the aluminum layer was on the outside.

Then, 200 ml of Ref. fuel C (toluene/isooctane=1/1) was filled as model gasoline into the pouches through the opening portions, and then the pouches were heat-sealed with a sealing width of 10 mm by the aforementioned method.

The pouches, filled with gasoline, were shelved in an explosion-proof thermo-hygrostat chamber (at 40° C. and 65% RH), and the weight of the pouches was measured every seven days over a period of three months. This experiment was carried out on five each of the coextrusion sheet pouches (a2) and the aluminum-covered pouches (b2). The weight of the pouches before and during the shelf-test was measured, and the gasoline permeation amount (fuel permeation amount) was calculated from the slope of a curve prepared according to the weight change of the pouches over the shelf time.

The fuel permeation amount of the pouches (a2) made only of the coextrusion sheet corresponds to the sum of the permeation amount through the pouch surface and through the heat-sealing portions, whereas the fuel permeation amount of the aluminum-covered pouches (b2) corresponds to the permeation amount through the heat-sealing portions.

{fuel permeation amount through (a2)}−{fuel permeation amount through (b2)} was taken as the fuel permeation amount per 10 μm of the barrier resin (A). Converting this into the permeation amount per 20 μm of a barrier resin (A) layer, the resulting value was taken as the fuel permeation amount (g·20 μm/m$^2$·day) of the barrier resin (A).

(4.2) Evaluation of the Fuel Permeation Amount of the Thermoplastic Resin (B)

Using a Labo-Plast Mill by Toyo Seiki Co. (with 20 mm diameter and L/D=22), extrusion molding was performed at a temperature corresponding to the melting point of the thermoplastic resin plus 20° C. with a coat hanger die of 300 mm width, and a sheet of 100 μm thickness was obtained. This sheet was cut into pieces of 210 mm×300 mm size.

Then these pieces were folded in the middle so their size became 210 mm×150 mm, and using the Heat Sealer T-230 by Fuji Impulse Co., pouches were prepared by heat-sealing of any two sides with dial 6 so that the seal width becomes 10 mm.

Then, 200 ml of Ref. fuel C (toluene/isooctane=1/1) was filled as model gasoline into the resulting pouches through the opening portions, and then the pouches were heat-sealed with a sealing width of 10 mm by the aforementioned method.

The pouches, filled with gasoline, were shelved in an explosion-proof thermo-hygrostat chamber (at 40° C. and 65% RH), and the weight of the pouches was measured every six hours over a period of three days. This experiment was carried out on five pouches. The weight of the pouches before and during the shelf-test was measured, and the gasoline permeation amount (fuel permeation amount) was calculated from the slope of a curve prepared according to the weight change of the pouches over the shelf time. By thickness conversion, the permeation amount (g·20 μm/m$^2$·day) was calculated.

(4.3) Evaluation of the Fuel Permeation Amount of the Barrier Material (C) (in Case of a Thermoplastic Resin)

The fuel permeation amount was measured using the same method as for the barrier resin (A).

(4.4) Evaluation of the Fuel Permeation Amount of the Barrier Material (C)(in Case of Pastes and Liquids)

For the thermoplastic resin (B), the aforementioned high-density polyethylene (HDPE) BA-46-055 by Paxon was provided, and using the Labo-Plast Mill by Toyo Seiki Co. (with 20 mm diameter and L/D=22), extrusion molding was performed at a temperature according to the melting point of the HDPE plus 20° C. with a coat hanger die of 300 mm width, and a sheet of 100 μm thickness was obtained. This sheet was cut into pieces of 210 mm×300 mm size, and a paste of the barrier material was applied to its surface with a Mayer bar so that the barrier material was applied at a rate of 5 g/m².

Then, a high-density polyethylene sheet of 100 μm thickness that was the same as described above was layered onto the surface on which the barrier material (C) has been applied, thereby producing a two-resin three-layer sheet.

One side of this multilayered sheet was covered with an aluminum adhesive tape (product by FP Corp., trade name "Alumi-seal"; fuel permeation amount of 0 g·20 μm/m²·day). Pouches were prepared with the method explained under 4.1 above using this covered layered sheet, and the fuel permeation amount of the barrier material (C) was determined.

(4.5) Evaluation of the Fuel Permeation Amount when the Barrier Material (C) is a Metal Foil The fuel permeation amount was taken to be 0 g·20 μm/m²·day.

(5) Fuel Permeation Amount of the Tank

First, 400 ml liters of Ref. fuel C (toluene/isooctane=1/1) were filled as model gasoline into a blow-molded 500 ml tank through an opening formed by blow-molding, and this opening was sealed with an aluminum adhesive tape (product by FP Corp., trade name "Alumi-seal"; fuel permeation amount of 0 g·20 m/m²·day). Then, the tank was shelved at 40° C. and 65% RH for three months. This experiment was performed with five 500 ml tanks, the average change of the weight of the tanks before and after the shelf test was determined, and taken as the gasoline permeation amount of the tank.

Example 1

For the thermoplastic resin (B), the high-density polyethylene (HDPE) BA-46-055 (having a density of 0.970 g/cm³, and a MFR of 0.03 g/10 min at 190° C. and 2160 g) by Paxon was used; for the adhesive resin (D), ADMER GT-6A (having a MFR of 0.94 g/10 min at 190° C. and 2160 g) by Mitsui Chemicals, Inc. was used; and for the barrier resin (A), an ethylene-vinyl alcohol copolymer including 32 mol % of ethylene and having a degree of saponification of 99.5 mol %, and having a MFR of 1.3/10 min at 190° C. and 2160 g was used. Using these resins, a fuel tank was obtained by blow-molding with a blow-molding machine TB-ST-6P by Suzuki Tetsukousho according to the following steps. (The molding in the following examples and comparative examples was performed with the same blow-molding machine.) A three-resin five-layered parison with the structure (inner layer) HDPE/Tie/Barrier/Tie/HDPE (outer layer) was extruded at 210° C. ("HDPE" denotes an high-density polyethylene layer, "Tie" denotes an adhesive layer, and "Barrier" denotes a barrier layer; this is the same in the following examples and comparative examples). Then, molding was performed at a mold-cramping force of 3 tons with a mold having a pinch-off part forming section as shown in FIG. 4a. Blowing was performed in the mold at 15° C., such that the ratio (X/Y) of the distance (X) between end portions of the barrier layer and the average thickness (Y) of the container body was 3/1000, the ratio (H/L) between height and length of the pinch part was 0.5, and the ratio (Y1/Y) between the total thickness (Y1) of the layers of the container body that are located on the inside with respect to the barrier layer and the average thickness (Y) of the container body was 48/100, and after cooling for 20 sec, a 500 ml tank with a total layering thickness of 1000 μm ((inner layer) HDPE/Tie/Barrier/Tie/HDPE (outer layer) =460/20/30/20/470 μm) was obtained (MFRbarrier/MFRinside=43). The amount of fuel permeating through the pinch-off part of the tank was 0.02 g/3 months, the impact resistance was Class A, and deformation of the tank was not observed.

Table 1 shows the molding conditions (ie., mold shape for the pinch-off part forming section, ratio (X/Y) of the distance (X) between end portions of the barrier layer and the average thickness (Y) of the container body, ratio (H/L) between height and length of the pinch-off part, ratio (Y1/Y) between the total thickness (Y1) of the layers of the container body that are located on the inside with respect to the barrier layer and the average thickness (Y) of the container body, and mold-cramping force) employed in this example, as well as the evaluation results (amount of fuel permeating through the pinch-off part, impact resistance, and tank deformation) for the obtained tank.

Example 2 and Comparative Examples 1 and 2

A 500 ml tank was prepared and evaluated with the same procedure as for Example 1, except that a mold having a pinch-off part forming section shown in one of FIGS. 4a, 4b and 4d (shown in Table 1) was used while adjusting the mold-cramping force. Table 1 shows the molding conditions for this example and the comparative examples as well as the evaluation results for the obtained tanks.

Comparative Example 3

For the thermoplastic resin (B), the high-density polyethylene (HDPE) J-REX (having a density of 0.970 g/cm³, and a MFR of 0.3 g/10 min at 190° C. and 2160 g) by JPO was used, for the adhesive resin (D) and the barrier resin (A), the same resins as the ones in Example 1 were used. Using these resins, a fuel tank was obtained by blow-molding according to the following steps. A three-resin five-layered parison with the structure (inner layer) HDPE/Tie/Barrier/Tie/HDPE (outer layer) was extruded at 210° C. Then, molding was performed at a mold-cramping force of 4 tons with a mold having a pinch-off part forming section as shown in FIG. 4a. Blowing was performed in the mold at 15° C., such that the ratio (X/Y) of the distance (X) between end portions of the barrier layer and the average thickness (Y) of the container body was 1/20000, the ratio (H/L) between height and length of the pinch-off part was 0.5, and the ratio (Y1/Y) between the total thickness (Y1) of the layers of the container body that are located on the inside with respect to the barrier layer and the average thickness (Y) of the container body was 45/100, and after cooling for 20 sec, a 500 ml tank with a total layering thickness of 1000 μm ((inner layer) HDPE/Tie/Barrier/Tie/HDPE (outer layer)=430/20/30/20/500 μm) was obtained MFRbarrier/MFRinside=4.3). The amount of fuel permeating through the pinch-off part of the tank was 0.01 g/3 months, the impact resistance was Class D, and deformation of the tank was not observed.

Table 1 shows the molding conditions used for this example, as well as the evaluation results for the obtained tank.

Comparative Example 4

For the thermoplastic resin (B), the adhesive resin (D) and the barrier resin (A), the same resins as the ones in Example 1 were used, and a fuel tank was obtained by blow-molding according to the following steps. A three-resin five-layered parison with the structure (inner layer) HDPE/Tie/Barrier/Tie/HDPE (outer layer) was extruded at 210° C. Then, molding was performed at a mold-cramping force of 3 tons with a mold having a pinch-off part forming section as shown in FIG. 4d. Blowing was performed in the mold at 15° C., such that the ratio (X/Y) of the distance (X) between end portions of the barrier layer and the average thickness (Y) of the container body was 3/1000, the ratio (H/L) between height and length of the pinch-off part was 0.5, and the ratio (Y1/Y) between the total thickness (Y1) of the layers of the container body that are located on the inside with respect to the barrier layer and the average thickness (Y) of the container body was 20/100, and after cooling for 20 sec, a 500 ml tank with a total layering thickness of 1000 μm ((inner layer) HDPE/Tie/Barrier/Tie/HDPE (outer layer)=180/20/30/20/750 μm) was obtained (MFRbarrier/MFRinside=43). The amount of fuel permeating through the pinch-off part of the tank was 0.02 g/3 months, the impact resistance was Class C, and deformation of the tank was not observed.

Table 1 shows the molding conditions used for this example, as well as the evaluation results for the obtained tank.

Example 3

For the thermoplastic resin (B) the adhesive resin (D) and the barrier resin (A), the same resins as the ones in Example 1 were used. Moreover, as a recovered resin, a resin mixture obtained by crushing a tank made in accordance with Example 1 was used. Using these resins, a fuel tank was obtained by blow-molding according to the following steps. A four-resin six-layered parison with the structure (inner layer) HDPE/Tie/Barrier/Tie/recovered layer/HDPE (outer layer) was extruded at 210° C. Then, molding was performed at a mold-cramping force of 3 tons with a mold having a pinch-off part forming section as shown in FIG. 4a. Blowing was performed in the mold at 15° C., such that the ratio (X/Y) of the distance (X) between end portions of the barrier layer and the average thickness (Y) of the container body was 4/1000, the ratio (H/L) between height and length of the pinch-off part was 0.5, and the ratio (Y1/Y) between the total thickness (Y1) of the layers of the container body that are located on the inside with respect to the barrier layer and the average thickness (Y) of the container body was 49/100, and after cooling for 20 sec, a 500 ml tank with a total layering thickness of 1000 μm ((inner layer) HDPE/Tie/Barrier/Tie/recovered layer/HDPE (outer layer)=470/20/30/20/200/260 μm) was obtained MFRbarrier/MFRinside=43). The amount of fuel permeating through the pinch-off part of the tank was 0.02 g/3 months, the impact resistance was Class A, and deformation of the tank was not observed.

Table 2 shows the molding conditions used for this example, as well as the evaluation results for the obtained tank.

Example 4 and Comparative Examples 5 and 6

A 500 ml tank was prepared and evaluated with the same procedure as for Example 3, except that a mold having a pinch-off part forming section shown in one of FIGS. 4a, 4c, and 4d (shown in Table 2) was used while adjusting the mold-cramping force.

Table 2 shows the molding conditions for this example and the comparative examples as well as the evaluation results for the obtained tanks.

Comparative Example 7

For the thermoplastic resin (B), the high-density polyethylene (HDPE) J-REX (having a density of 0.970 g/cm$^3$, and a MFR of 0.3 g/10 min at 190° C. and 2160 g) by JPO was used; for the adhesive resin (D) and the barrier resin (A), the same resins as the ones in Example 1 were used. Moreover, as a recovered resin, a resin mixture obtained by crushing a tank made in accordance with Example 1 was used. Using these resins, a fuel tank was obtained by blow-molding according to the following steps. A four-resin six-layered parison with the structure (inner layer) HDPE/Tie/Barrier/Tie/recovered layer/HDPE (outer layer) was extruded at 210° C. Then, molding was performed at a mold-cramping force of 4 tons with a mold having a pinch-off part forming section as shown in FIG. 4a Blowing was performed in the mold at 15° C., such that the ratio (X/Y) of the distance (X) between end portions of the barrier layer and the average thickness (Y) of the container body was 1/30000, the ratio (H/L) between height and length of the pinch-off part was 0.5, and the ratio (Y1/Y) between the total thickness (Y1) of the layers of the container body that are located on the inside with respect to the barrier layer and the average thickness (Y) of the container body was 45/100, and after cooling for 20 sec, a 500 ml tank with a total layering thickness of 1000 μm ((inner layer) HDPE/Tie/Barrier/Tie/recovered layer/HDPE (outer layer)=430/20/30/20/200/300 μm) was obtained (MFRbarrier/MFRinside=4.3). The amount of fuel permeating through the pinch-off part of the tank was 0.01 g/3 months, the impact resistance was Class D, and deformation of the tank was not observed.

Table 2 shows the molding conditions used for this example, as well as the evaluation results for the obtained tank.

Comparative Example 8

For the thermoplastic resin (B), the adhesive resin (D) and the barrier resin (A), the same resins as the ones in Example 1 were used. Moreover, as a recovered resin, a resin mixture obtained by crushing a tank made in accordance with Example 1 was used. Using these resins, a fuel tank was obtained by blow-molding according to the following steps. A four-resin six-layered parison with the structure (inner layer) HDPE/Tie/Barrier/Tie/recovered layer/HDPE (outer layer) was extruded at 210° C. Then, molding was performed at a mold-cramping force of 3 tons with a mold having a pinch-off part forming section as shown in FIG. 4d. Blowing was performed in the mold at 15° C., such that the ratio (X/Y) of the distance (X) between end portions of the barrier layer and the average thickness (Y) of the container body was 3/1000, the ratio (H/L) between height and length of the pinch-off part was 0.5, and the ratio (Y1/Y) between the total thickness (Y1) of the layers of the container body that are located on the inside with respect to the barrier layer and the average thickness (Y) of the container body was 21/100, and after cooling for 20 sec, a 500 ml tank with a total layering thickness of 1000 μm ((inner layer) HDPE/Tie/Barrier/Tie/recovered layer/HDPE (outer layer)=190/20/30/20/210/530 μμm) was obtained MFRbarrier/MFRinside=43). The amount of fuel permeating through the pinch-off part of the tank was 0.02 g/3 months, the impact resistance was Class D, and deformation of the tank was not observed.

Table 2 shows the molding conditions used for this example, as well as the evaluation results for the obtained tank Example 5

For the thermoplastic resin (B), the adhesive resin (D) and the barrier resin (A), the same resins as the ones in Example 1 were used. Moreover, as a recovered resin, a resin mixture obtained by crushing a tank made in accordance with Example 1 was used. Using these resins, a fuel tank was obtained by blow-molding according to the following steps. A four-resin seven-layered parison with the structure (inner layer) HDPE/recovered layer/Tie/Barrier/Tie/recovered layer/HDPE (outer layer) was extruded at 210° C. Then, molding was performed at a mold-cramping force of 3 tons with a mold having a pinch-off part forming section as shown in FIG. 4a. Blowing was performed in the mold at 15° C., such that the ratio (X/Y) of the distance (X) between end portions of the barrier layer and the average thickness (Y) of the container body was 4/1000, the ratio (H/L) between height and length of the pinch-off part was 0.5, and the ratio (Y1/Y) between the total thickness (Y1) of the layers of the container body that are located on the inside with respect to the barrier layer and the average thickness (Y) of the container body was 47/100, and after cooling for 20 sec, a 500 ml tank with a total layering thickness of 1000 μm ((inner layer) HDPE/recovered layer/Tie/Barrier/Tie/recovered layer/HDPE (outer layer)=260/190/20/30/20/200/280 μm) was obtained (MFRbarrier/MFRinside=43). The amount of fuel permeating through the pinch-off part of the tank was 0.02 g/3 months, the impact resistance was Class B, and deformation of the ta was not observed.

Table 3 shows the molding conditions used for this example, as well as the evaluation results for the obtained tank.

Example 6 and Comparative Examples 9 and 10

A 500 ml tank was prepared and evaluated with the same procedure as for Example 5, except that a mold having a pinch-off part forming section shown in one of FIGS. 4a, 4b, and 4d (shown in Table 3) was used while adjusting the mold-cramping force.

Table 3 shows the molding conditions for this example and the comparative examples as well as the evaluation results for the obtained tanks.

Comparative Example 11

For the thermoplastic resin (B), the high-density polyethylene (HDPE) J-REX (having a density of 0.970 g/cm$^3$, and a MFR of 0.3 g/10 min at 190° C. and 2160 g) by JPO was used; and for the adhesive resin (D) and the barrier resin (A), the same resins as the ones in Example 1 were used. Moreover, as a recovered resin, a resin mixture obtained by crushing a tank made in accordance with Example 1 was used. Using these resins, a fuel tank was obtained by blow-molding according to the following steps. A four-resin seven-layered parison with the structure (inner layer) HDPE/recovered layer/Tie/Barrier/Tie/recovered layer/HDPE (outer layer) was extruded at 210° C. Then, molding was performed at a mold-cramping force of 4 tons with a mold having a pinch-off part forming section as shown in FIG. 4a. Blowing was performed in the mold at 15° C., such that the ratio (X/Y) of the distance (X) between end portions of the barrier layer and the average thickness (Y) of the container body was 1/30000, the ratio (H/L) between height and length of the pinch-off part was 0.5, and the ratio (Y1/Y) between the total thickness (Y1) of the layers of the container body that are located on the inside with respect to the barrier layer and the average thickness (Y) of the container body was 44/100, and after cooling for 20 sec, a 500 ml tank with a total layering thickness of 1000 μm ((inner layer) HDPE/recovered layer/Tie/Barrier/Tie/recovered layer/HDPE (outer layer)=230/190/20/30/20/220/290 μm) was obtained MFRbarrier/MFRinside=4.3). The amount of fuel permeating through the pinch-off part of the tank was 0.01 g/3 months, the impact resistance was Class D, and deformation of the tank was not observed.

Table 3 shows the molding conditions used for this comparative example, as well as the evaluation results for the obtained tank.

Comparative Example 12

For the thermoplastic resin (B), the adhesive resin (D) and the barrier resin (A), the same resins as the ones in Example 1 were used. Moreover, as a recovered resin, a resin mixture obtained by crushing a tank made in accordance with Example 1 was used. Using these resins, a fuel tank was obtained by blow-molding according to the following steps. A four-resin seven-layered parison with the structure (inner layer) HDPE/recovered layer/Tie/Barrier/Tie/recovered layer/HDPE (outer layer) was extruded at 210° C. Then, molding was performed at a mold-cramping force of 3 tons with a mold having a pinch-off part forming section as shown in FIG. 4d. Blowing was performed in the mold at 15° C., such that the ratio (X/Y) of the distance (X) between end portions of the barer layer and the average thickness (Y) of the container body was 3/1000, the ratio (H/L) between height and length of the pinch-off part was 0.5, and the ratio (Y1/Y) between the total thickness (Y1) of the layers of the container body that are located on the inside with respect to the barer layer and the average thickness (Y) of the container body was 19/100, and after cooling for 20 sec, a 500 ml tank with a total layering thickness of 1000 μm ((inner layer) HDPE/recovered layer/Tie/Barrier/Tie/recovered layer/HDPE (outer layer)=100/70/20/30/20/270/490 μm) was obtained (MFRbarrier/MFRinside=43). The amount of fuel permeating through the pinch-off part of the tank was 0.02 g/3 months, the impact resistance was Class D, and deformation of the tank was not observed.

Table 3 shows the molding conditions used for this example, as well as the evaluation results for the obtained tank.

TABLE 1

| | Molding conditions | | | | | Evaluation of tank | | |
|---|---|---|---|---|---|---|---|---|
| | X/Y | Y1/Y | H/L | Pinch-off blade | Mold cramping force (ton) | Fuel permeation through pinch-off portion (g/3 months) | Impact resistance | Deformation of tank |
| Example 1 | 3/1000 | 48/100 | 0.5 | FIG. 4a | 3 | 0.02 | A | No |
| Example 2 | 1/200 | 47/100 | 1 | FIG. 4d | 2 | 0.03 | A | No |
| Comparative Example 1 | 1/6 | 52/100 | 1 | FIG. 4a | 0.8 | 0.07 | B | Yes |
| Comparative | 1/6 | 43/100 | 4 | FIG. 4b | 0.8 | 0.07 | C | Yes |

TABLE 1-continued

| | Molding conditions | | | | Evaluation of tank | | |
|---|---|---|---|---|---|---|---|
| | X/Y | Y1/Y | H/L | Pinch-off blade | Mold cramping force (ton) | Fuel permeation through pinch-off portion (g/3 months) | Impact resistance | Deformation of tank |
| Example 2 | | | | | | | | |
| Comparative Example 3 | 1/20000 | 45/100 | 0.5 | FIG. 4a | 4 | 0.01 | D | No |
| Comparative Example 4 | 3/1000 | 20/100 | 0.5 | FIG. 4d | 3 | 0.02 | C | No |

TABLE 2

| | Molding conditions | | | | Evaluation of tank | | |
|---|---|---|---|---|---|---|---|
| | X/Y | Y1/Y | H/L | Pinch-off blade | Mold cramping force (ton) | Fuel permeation through pinch-off portion (g/3 months) | Impact resistance | Deformation of tank |
| Example 3 | 4/1000 | 49/100 | 0.5 | FIG. 4a | 3 | 0.02 | A | No |
| Example 4 | 3/400 | 48/100 | 1 | FIG. 4d | 2 | 0.03 | B | No |
| Comparative Example 5 | 1/6 | 53/100 | 1 | FIG. 4a | 0.8 | 0.07 | C | Yes |
| Comparative Example 6 | 1/6 | 44/100 | 4 | FIG. 4c | 0.8 | 0.07 | C | Yes |
| Comparative Example 7 | 1/30000 | 45/100 | 0.5 | FIG. 4a | 4 | 0.01 | D | No |
| Comparative Example 8 | 3/1000 | 21/100 | 0.5 | FIG. 4d | 3 | 0.02 | D | No |

TABLE 3

| | Molding conditions | | | | Evaluation of tank | | |
|---|---|---|---|---|---|---|---|
| | X/Y | Y1/Y | H/L | Pinch-off Blade | Mold cramping force (ton) | Fuel permeation through pinch-off Portion (g/3 months) | Impact resistance | Deformation of tank |
| Example 5 | 4/1000 | 47/100 | 0.5 | FIG. 4a | 3 | 0.02 | B | No |
| Example 6 | 3/400 | 48/100 | 1 | FIG. 4d | 2 | 0.03 | B | No |
| Comparative Example 9 | 1/6 | 54/100 | 1 | FIG. 4a | 0.8 | 0.07 | D | Yes |
| Comparative Example 10 | 1/6 | 42/100 | 4 | FIG. 4b | 0.8 | 0.07 | D | Yes |
| Comparative Example 11 | 1/30000 | 44/100 | 0.5 | FIG. 4a | 4 | 0.01 | D | No |
| Comparative Example 12 | 3/1000 | 19/100 | 0.5 | FIG. 4d | 3 | 0.02 | D | No |

The coextrusion blow-molded ta obtained by Examples 1 to 6, which have pinch-off parts with a configuration according to the present invention, have good barer properties, and excellent dart-impact strength, and have little or no deformation. In Comparative Examples 1 and 2, on the other hand, in which the ratio (X/Y) of the distance (X) between end portions of the barrier layer and the average thickness (Y) of the container body exceeds 1/10, the barrier properties are unsatisfactory. The impact resistance of the pinch-off parts is low, and deformation can be observed in the resulting tanks. Moreover, in Comparative Example 3, in which the ratio (X/Y) is less than 1/10000, the impact resistance of the pinch-off part is extra-ordinarily low. Furthermore, in Comparative Example 4, in which the ratio (Y1/Y) between the total thickness (Y1) of the layers of the container body that are located on the inside with respect to the barrier layer and the average thickness (Y) of the container body is less than 3/10, the impact resistance of the pinch-off part is insufficient.

The present invention can also be advantageously applied to coextrusion blow-molded containers including a recovered layer among their layers. Also when recovered layers are arranged at both sides of the barrier layer, as for example in Examples 5 and 6 of the present invention, a coextrusion blow-molded container was obtained, in which the barrier properties are excellent, in which the container has no deformation, and in which the impact resistance of the pinch-off part can be maintained to a certain degree. On the other hand, in Comparative Examples 9 to 12, in which recovered layers are arranged on both sides of the barrier layer and which do not have the configuration of the present invention, the impact resistance was in all cases extra-ordinarily poor.

Example 7

For the thermoplastic resin (B), the high-density polyethylene (HDPE) BA-46-055 (having a density of 0.970 g/cm$^3$, a MFR of 0.03 g/10 min at 190° C. and 2160 g, and a fuel permeation amount of 4000 g·20 μm/m$^2$·day) by Paxon was used; for the adhesive resin (D), ADMER GT-6A (having a MFR of 0.94 g/10 min at 190° C. and 2160 g) by Mitsui Chemicals, Inc. was used; and for the barrier resin (A), an ethylene-vinyl alcohol copolymer including 32 mol % of ethylene and having a degree of saponification of 99.5 mol %, a MFR of 1.3 g/10 min at 190° C. and 2160 g, and a fuel permeation amount of 0.003 g·20μm/m$^2$·day was used. Using these resins, a fuel tank was obtained by blow-molding according to the following steps. A three-resin five-layered parson with the structure (inner layer) HDPE/Tie/Barrier/Tie/HDPE (outer layer) was extruded at 210° C. Blowing was performed in the mold at 15° C., and after cooling for 20 sec, a 500 ml tank with a total layering thickness of 1000 μm ((inner layer) HDPE/Tie/Barrier/Tie/HDPE (outer layer) =460/20/30/20/470 μm) was obtained. The bottom surface diameter of the tank was 100 mm, and the pinch-off part was 100 mm long, 5 mm wide and 1 mm high. The cutting face of the pinch-off part of the tank was covered with an aluminum adhesive tape (barrier member; product by FP Corp., trade name "Alumi-seal"; fuel permeation amount of 0 g·20 μm/m$^2$·day; this is the same as for the aluminum adhesive tapes used for the following examples and comparative examples). In this example, the gasoline permeation amount of the tank was 0.02 g/3 months.

Table 4 shows whether the pinch-off part of the fuel tank obtained in this example was covered, the value of Y2/Y, and the gasoline permeation amount. Table 4 also shows these results of Examples 8 to 10 and Comparative Examples 13 and 14 described below. For the tanks of these examples and comparative examples that have an opening, Table 4 also shows whether the cutting face of the opening has been covered.

Example 8

A 500 ml tank was manufactured as in Example 7, and an opening of 50 mm diameter was made in the tank body. The cutting face of this opening in the tank body was covered with aluminum adhesive tape. A polyethylene-aluminum layered film of 70 mm diameter with the structure 40 μm polyethylene/12 μm aluminum/40 μm polyethylene was heat-laminated onto the opening portion with a 170° C. heating iron at a sealing width of 10 mm, so that it covers the opening portion from the outer layer. After the cutting face of the pinch-off part of the tank was covered with an aluminum adhesive tape like in Example 7, the gasoline permeation amount of the tank was measured. In this example, the gasoline permeation amount of the tank was 0.02 g/3 months.

Example 9

The preparation of this example was the same as that for Example 8, except that the cutting face of the opening of 50 mm diameter in the tank body was not covered with an aluminum adhesive tape. Then, the gasoline permeation amount of the tank was measured. The measured permeation amount of the tank was 0.05 g/3 months.

Example 10

For the thermoplastic resin (B), the adhesive resin (D) and the barrier resin (A), the same resins as the ones in Example 7 were used. Using these resins, a fuel tank was obtained by blow-molding according to the following steps. A three-resin five-layered parison with the structure (inner layer) HDPE/Tie/Barrier/Tie/HDPE (outer layer) was extruded at 210° C. Blowing was performed in the mold at 15° C., and after cooling for 20 sec, a 500 ml tank with a total layering thickness of 1000 μm ((inner layer) HDPE/Tie/Barrier/Tie/HDPE (outer layer)=800/20/30/20/130 μm) was obtained. In this example, the ratio (Y2/Y) of total thickness (Y2) of the layers located on the outside with respect to the barrier layer and the average thickness (Y) of the container body was 15/100.

After an opening of 50 mm diameter was made in the tank body, the same polyethylene-aluminum layered film as in Example 8 was heat-laminated on the opening portion. Moreover, the cutting face of the pinch-off part of the tank was covered with an aluminum adhesive tape as in Example 8, and then the gasoline permeation amount of the tank was measured. The measured permeation amount of the tank was 0.03 g/3 months.

Comparative Example 13

The preparation of this example was the same as that for Example 7, except that the cutting face of the pinch-off part was not covered with an aluminum adhesive tape. Then, the gasoline permeation amount of the tank was measured. The measured permeation amount of the tank was 0.04 g/3 months.

Comparative Example 14

The preparation of this example was the same as that for Example 8, except that the cutting face of the opening in the tank body and the cutting face of the pinch-off part were not covered with an aluminum adhesive tape. Then, the gasoline permeation amount of the tank was measured. The measured permeation amount of the tank was 0.07 g/3 months.

TABLE 4

| | Pinch-off portion*1 | Cutting face of aperture portion*1 | Y2/Y | Fuel permeation amount (g/3 months) |
|---|---|---|---|---|
| Example 7 | ○ | — | 49/100 | 0.02 |
| Example 8 | ○ | ○ | 49/100 | 0.02 |
| Example 9 | ○ | X | 49/100 | 0.05 |
| Example 10 | ○ | X | 15/100 | 0.03 |
| Comparative Example 13 | X | — | 49/100 | 0.04 |
| Comparative Example 14 | X | X | 49/100 | 0.07 |

*1 ○: Covered with aluminum pressure-sensitive tape
X: Not covered with aluminum pressure-sensitive tape In Example 7, in which the container body is not provided with an opening and the cutting face of the pinch-off part is covered with an aluminum adhesive tape, the fuel container showed excellent gasoline barrier properties. In Comparative Example 13, on the other hand, in which the cutting face of the pinch-off part is not covered with a barrier member, the fuel permeation amount was 0.04 g/3 months, and thus twice as high as that of Example 7.

Example 8, in which both the cutting face of the pinch-off part and the cutting face of the opening provided in the body of the container are covered with an aluminum adhesive tape, displayed particularly excellent gasoline barrier properties.

In Examples 9 and 10 the fuel permeation amount is kept low, because the pinch-off part is covered with a barrier member, but the fuel permeation amount is higher than in Example 8, because the cutting face of the opening is not covered. Example 10, in which the value of (Y2/Y) is less than 45/100, showed better gasoline barrier properties than Example 9.

On the other hand, in Comparative Example 14, in which neither the cutting face of the pinch-off part nor the cutting face of the opening provided in the body of the container are covered with an aluminum adhesive tape, a higher rate of fuel permeation was observed. The fuel permeation was three times the permeation obtained in Example 8, in which both are covered with an aluminum adhesive tape.

Example 11

For the barrier resin (A), EVAL (registered trademark) F101B (EVOH produced by Kuraray Co., Ltd.; referred to as EVOH(A-1) in the following) was used; for the thermoplastic resin (B), a high-density polyethylene (HDPE; HZ8200B by Mitsui Chemicals, Inc.) was used; and for the adhesive resin (D), maleic anhydride modified LDPE (Admar GT5A by Mitsui Chemicals, Inc.) was used, and a 35-liter tank having a 0.85 m² surface area and an EVOH-based multi layered structure with five layers of three resins was prepared with a direct-blow-molding machine. The layering structure of this tank was (outer layer) HDPE/adhesive resin/EVOH (A-1)/adhesive resin/HDPE (inner layer)=2500/100/150/100/2500 µm. Then, for the barrier material (C), a mixture (referred to as barrier material (C-1)) was prepared using the following resins: 30 parts by weight of EVOH containing 32 mol % ethylene, and having a degree of saponification of 99.5% and a MFR of 1.6 g/10 min at 190° C. and 2160 g; 15 parts by weight of saponified ethylene-vinyl acetate copolymer containing 89 mol % ethylene, and having a degree of saponification of 97% and a MFR of 5 g/10 mm at 190° C. and 2160 g; and 55 parts by weight of polyethylene having a density of 0.952 and a MFR of 0.3 g/10 min at 190° C. and 2160 g. These resins were given into biaxial screw-type vent extruder, and extruding under the presence of nitrogen at 220° C., pellets were obtained. The fuel permeation amount of the resulting barrier material (C-1) was 45 g·20 µm/m²·day.

Figure 11A:
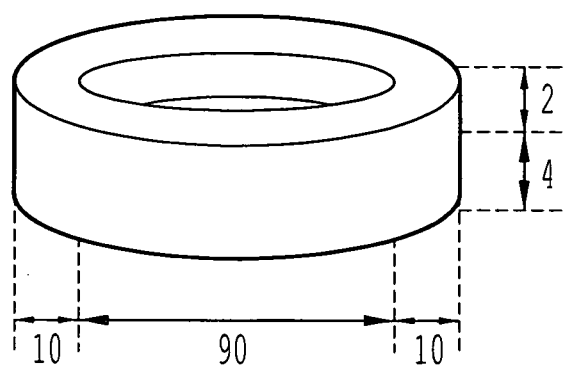
FIG. 11a is a schematic view showing the shape of the barrier member prepared in Example 11 and FIG. 11b is a cross-section showing an opening of the body of the fuel container on which the barrier member is mounted.
Figure 11B:
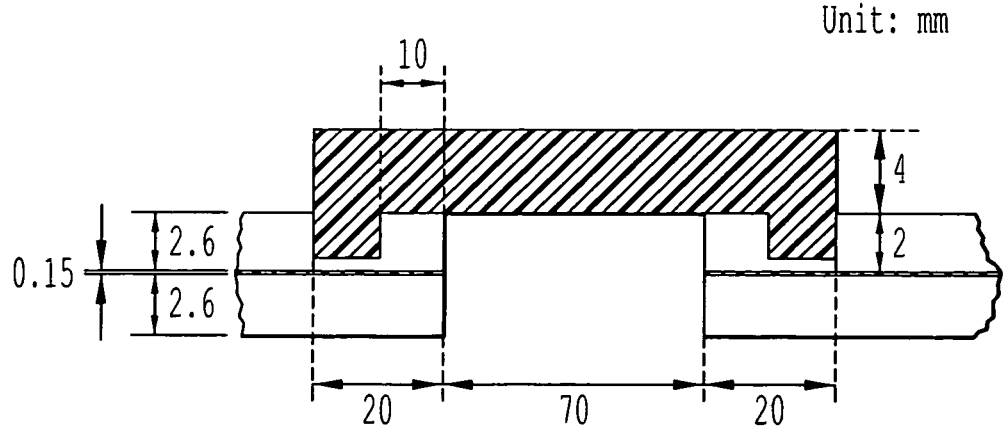

The barrier material (C-1) was given into an injection molding machine, and the cylindrical injection-molded article shown in FIG. 11 was obtained as a barrier member. As shown in FIGS. 11a and 11b, this molded article has an outer diameter of 110 mm, an inner diameter of 90 mm, a height of 6 mm, and a depth of 2 mm.

The multilayered body of the tank that has been prepared as described above was provided with two openings of 70 mm diameter, and grooves with an outer diameter of 10 mm, an inner diameter of 100 m, and a depth of 2 mm were provided concentrically around these openings. The groove portions and the cylindrical barrier member were both heated and for 40 sec with a 250° C. iron plate to be softened, and then the peripheral portion of the barrier member was fitted and pressed into the groove. Thus, a multilayered tank with barrier members mounted on its two openings was obtained (FIG. 11b shows a cross-sectional view of the vicinity of one of the openings). The fuel permeation of this multilayered tank was evaluated as follows.

Evaluation of Fuel Permeation:

First, 25 liters of Ref. fuel C (toluene/isooctane=1/1), as model gasoline, were filled into the obtained multilayered tank through an opening formed by blow-molding, and this opening was sealed with an aluminum adhesive tape. Then, the tank was put into an explosion-proof thermo-hygrostat chamber (40° C. and 65% RH), and after three months, the weight loss (W) was measured (n=5). This experiment was performed with five 35-liter tanks, the average change of the weight of the tanks before and after the above-mentioned test was determined, and taken as the gasoline permeation amount of the tank.

For the control tank, a tank was prepared with the same procedure as described above, except that the cutting faces of the openings provided in the tank body were covered with aluminum adhesive tape. This control tank was also put into an explosion-proof thermo-hygrostat chamber (40° C. and 65% RH), and after three months, the weight loss (w) was measured (n=5). The amount of fuel permeating through the outer layer made of the thermoplastic resin (B) located on the outside with respect to the barrier layer can be calculated by the following equation:

fuel permeation amount (g/3 months)=W−w

In this example, the fuel permeation amount was 0.18 g/3 months.

Example 12

Figure 12A:
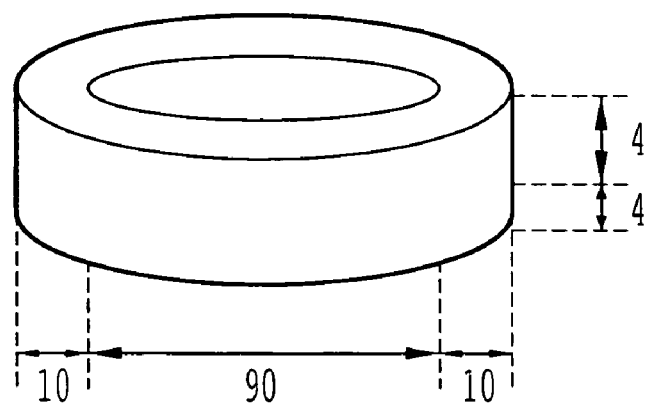
FIG. 12a is a schematic view showing the shape of the barrier member prepared in Example 12 and FIG. 12b is a cross-section showing an opening of the body of the fuel container on which the barrier member is mounted.
Figure 12B:
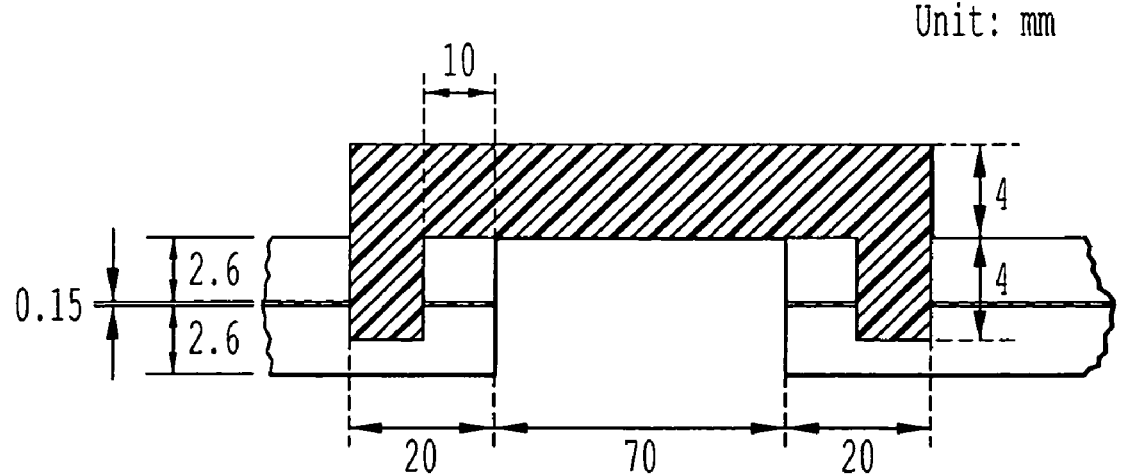

A multilayered tank was prepared with the same procedure as described for Example 11, except that the shape of the injection-molded article (i.e., barrier member) made of the barrier material (C-1) was changed to the shape shown in FIG. 12a, and the depth of the groove provided around the openings of the tank was changed to 4 mm. FIG. 12b shows a cross-sectional view of the vicinity of one of the openings. The measured fuel permeation amount of this multilayered tank was 0.01 g/3 months.

Example 13

Figure 13A:
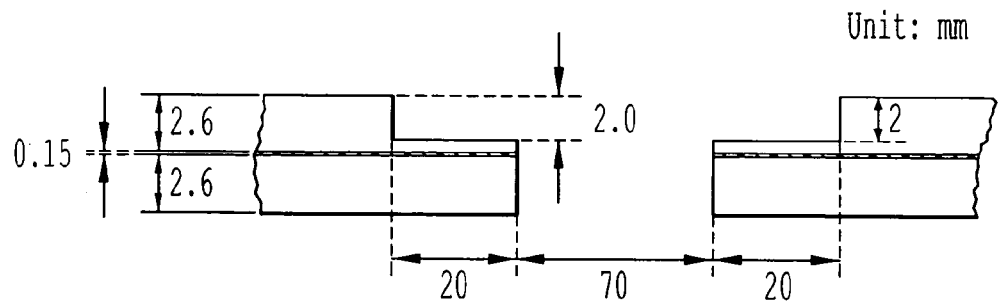
FIGS. 13A and 13B are a schematic view illustrating the steps for forming a cutout that is concentric with the opening in the multilayered tank, and mounting a barrier member onto this cutout in Example 13.
Figure 13B:
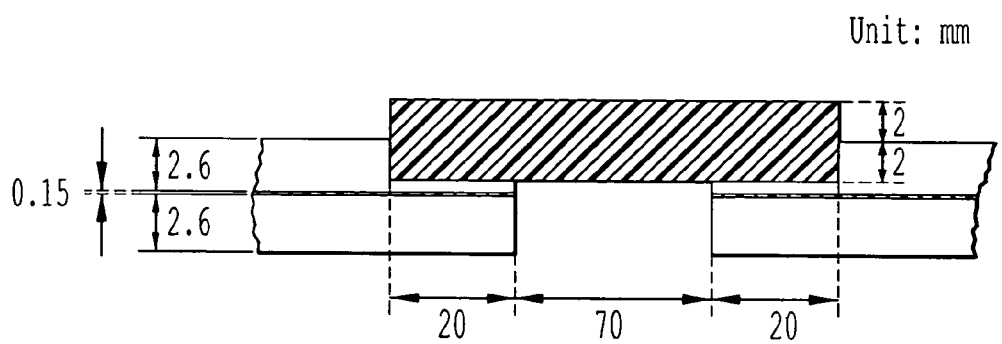

A multilayered tank including an EVOH barrier layer with 35 liter capacity was prepared with the same procedure as for Example 11, and the body of the tank was provided with two circular openings of 70 mm diameter. Then, as shown in FIG. 13a, a portion of the outer layer of the tank body was cut away, so as to attain cutouts of 110 mm diameter and 2 mm depth, concentrically around the openings. Disk-shaped injection-molded articles made of the barrier material (C-1) obtained in Example 11 and having a diameter of 10 mm and 4 mm thickness were fitted into the cutouts as barrier members. Thus, a multilayered tank with barrier members mounted onto its two opening portions was obtained (see FIG. 13b). The measured fuel permeation amount of this multilayered tank was 0.10 g/3 months.

Comparative Example 15

Figure 14:
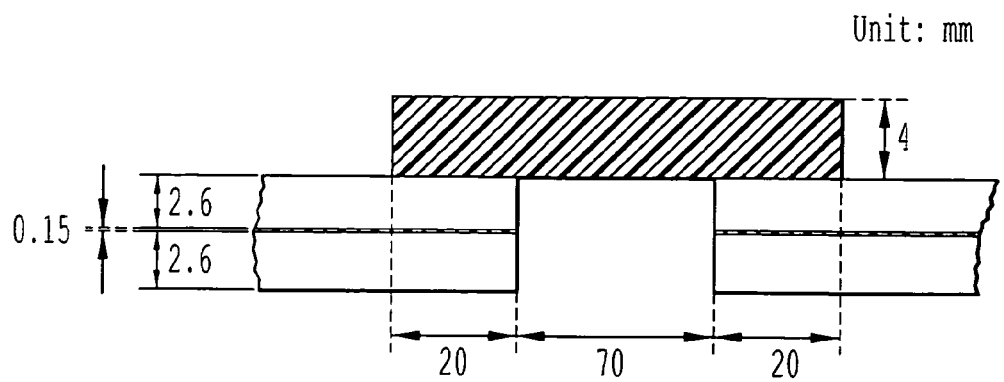
FIG. 14 is a schematic view showing an opening in the body of the fuel container on which the barrier member prepared in Comparative Example 15 is mounted.

A multilayered tank including an EVOH barrier layer with 35 liter capacity was prepared with the same procedure as for Example 11, and the body of the tank was provided with two circular openings of 70 mm diameter. Disk-shaped injection-molded articles made of the barrier material (C-1) and having a diameter of 110 mm and 4 mm thickness were obtained. The openings were covered with these barrier members, so that the center of the openings coincides with the center of the corresponding barrier member, the barrier members were thermally fused to the tank main body, and thus the openings were sealed. Thus, a multilayered tank with barrier members mounted onto its two opening portions was obtained (see FIG. 14). The measured fuel permeation amount of this multilayered tank was 0.42 g/3 months.

The multilayered tanks of Examples 11 to 13, which are configured in accordance with the present invention, can effectively suppress the permeation of fuel through the cutting face of an opening, and they have excellent gasoline barrier properties. On the other hand, with Comparative Example 15, which is not configured in accordance with the present invention, satisfactory barrier properties could not be attained.

Thus, the present invention provides a fuel container with high gasoline barrier properties. The fuel container, in which the pinch-off part has a specified configuration, has excellent dart-impact strength and has little or no deformation. Moreover, excellent gasoline barrier properties can also be attained when a component for fuel containers is mounted onto opening portions provided in the container body. When the fuel container component has good gasoline barrier properties, then even higher gasoline barrier properties can be attained. The fuel container of the present invention can be used as a gasoline tank for a vehicle.

What is claimed is:

1. A fuel container made of a layered structure, the layered structure at least comprising:
    a fuel barrier layer made of a fuel barrier resin (A); and
    an outer layer made of a thermoplastic resin (B) that is different from the fuel barrier resin (A),
    wherein the fuel container is provided with an opening through its body, wherein a cutting face of a layer at the opening is covered by a fuel barrier member made of a fuel barrier material (C), wherein the layer covered by the fuel barrier member is located on the outside with respect to the fuel barrier layer, and
    wherein the fuel barrier member is exposed to an opening space through the fuel container, or the fuel barrier member and the fuel barrier layer are exposed to the opening space through the fuel container.

2. The fuel container of claim 1, comprising:
    an intermediate layer serving as the fuel barrier layer; and
    an inner layer and an outer layer made of the thermoplastic resin (B).

3. The fuel container of claim 1, wherein an adhesive resin layer is located between the fuel barrier layer and the layer made of the thermoplastic resin (B).

4. The fuel container of claim 1, wherein the fuel barrier resin (A) is at least one selected from the group consisting of polyvinyl alcohol resins, polyamides, and aliphatic polyketones.

5. The fuel container of claim 1, wherein the thermoplastic resin (B) is high-density polyethylene.

6. The fuel container of claim 1, wherein the fuel barrier material (C) is at least one selected from the group consisting of metal foil, epoxy resin, polyvinylidene chloride resin, polyvinylalcohol resin, polyamide resin, polyester resin, and fluorocarbon resin.

7. The fuel container of claim 1, wherein the fuel barrier member covers the cutting face via an adhesive.

8. The fuel container of claim 1, wherein a pinch-off part of the fuel container is covered with a fuel barrier member.

9. The fuel container of claim 1, wherein a component for fuel containers is mounted onto the opening portion.

10. The fuel container of claim 1, wherein a gasoline permeation amount (measured at 40° C. and 65% RH) of the fuel barrier resin (A) is at most 100 g·20 µm/m²·day.

11. The fuel container of claim 10, wherein a gasoline permeation amount (measured at 40° C. and 65% RH) of the fuel barrier material (C) is at most 400 g·20 µm/m²·day.

12. A fuel container made of a layered structure, the layered structure at least comprising:
    a fuel barrier layer made of a fuel barrier resin (A); and
    an outer layer made of a thermoplastic resin (B) that is different from the fuel barrier resin (A),
    wherein the fuel container is provided with an opening, a cut-out or a groove is provided around the opening in an outer surface of the outer layer of the fuel container such that the cut-out or the groove does not extend completely through the outer layer, and the cut-out or the groove is covered or filled with a fuel barrier member made of a fuel barrier material (C); and
    wherein the fuel barrier layer is exposed to an opening space.

13. The fuel container of claim 12, comprising:
    an intermediate layer serving as the fuel barrier layer; and
    an inner layer and an outer layer made of the thermoplastic resin (B).

14. The fuel container of claim 12, wherein an adhesive resin layer is located between the fuel barrier layer and the layer made of the thermoplastic resin (B).

15. The fuel container of claim 12, wherein the fuel barrier resin (A) is at least one selected from the group consisting of polyvinyl alcohol resins, polyamides, and aliphatic polyketones.

16. The fuel container of claim 12, wherein the thermoplastic resin (B) is high-density polyethylene.

17. The fuel container of claim 12, wherein the fuel barrier material (C) is at least one selected from the group consisting of metal foil, epoxy resin, polyvinylidene chloride resin, polyvinylalcohol resin, polyamide resin, polyester resin, and fluorocarbon resin.

18. The fuel container of claim 12, wherein the fuel barrier member covers the cutting face, cut-out or groove via an adhesive.

19. The fuel container of claim 12, wherein a pinch-off part of the fuel container is covered with a fuel barrier member.

20. The fuel container of claim 12, wherein the cut-out or groove provided in the outer surface around the opening completely surrounds the opening.

21. The fuel container of claim 12, wherein a depth of the cut-out or groove is 0.1 to 0.8 times an average thickness (Y) of the container body.

22. The fuel container of claim 12, wherein a depth of the cut-out or groove is at least 0.2 and less than 1 times a total thickness (Y2) of layers locating on the outside with respect to the fuel barrier layer.

23. The fuel container of claim 12, wherein a ratio (Y2/Y) of total thickness (Y2) of layers located on the outside with respect to the fuel barrier layer and the average thickness (Y) of the container body is at most 45/100.

24. The fuel container of claim 12, wherein a gasoline permeation amount (measured at 40° C. and 65% RH) of the fuel barrier resin (A) is at most 100 g·20 µm/m²·day.

25. The fuel container of claim 24, wherein a gasoline permeation amount (measured at 40° C. and 65% RH) of the fuel barrier material (C) is at most 400 g·20 µm/m²·day.

26. The fuel container of claim 12, wherein a component for fuel containers is mounted onto the opening portion.

27. The fuel container of claim 26, wherein the component for fuel containers is a fuel barrier member made of the fuel barrier material (C), and the cut-out or groove is covered by mounting the component for fuel containers.

* * * * *